(12) United States Patent
Onuki

(10) Patent No.: US 8,081,843 B2
(45) Date of Patent: Dec. 20, 2011

(54) IMAGE-PICKUP APPARATUS

(75) Inventor: Ichiro Onuki, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1041 days.

(21) Appl. No.: 11/936,483

(22) Filed: Nov. 7, 2007

(65) Prior Publication Data

US 2008/0107355 A1    May 8, 2008

(30) Foreign Application Priority Data

Nov. 7, 2006 (JP) ................................ 2006-302047

(51) Int. Cl.
*G06K 9/32* (2006.01)
(52) U.S. Cl. ...................................................... 382/294
(58) Field of Classification Search ................. 382/294, 382/295, 296, 297, 298; 345/629, 651, 662, 345/677
See application file for complete search history.

(56) References Cited

U.S. PATENT DOCUMENTS

| 7,697,750 | B2* | 4/2010 | Simmons | 382/154 |
| 2001/0006426 | A1* | 7/2001 | Son et al. | 359/15 |

FOREIGN PATENT DOCUMENTS

| JP | 61-022316 | 1/1986 |
| JP | 06-175015 | 6/1994 |
| JP | 09-184972 | 7/1997 |
| JP | 11-122517 | 4/1999 |
| JP | 2000-002909 | 1/2000 |
| JP | 2003-140246 | 5/2003 |
| JP | 2004-212891 | 7/2004 |
| JP | 2005-181373 | 7/2005 |

* cited by examiner

*Primary Examiner* — Brian Le

(74) *Attorney, Agent, or Firm* — Canon U.S.A. Inc., I.P. Division

(57) ABSTRACT

An image-pickup apparatus is provided which allows a user to accurately and easily know the out-of-focus amount for various images or objects. The image-pickup apparatus which picks up an image of an object comprises a producing unit for producing a pair of object images, the object images being displaced from each other in accordance with a displacement of the object from an in-focus position in an optical axis direction, an image combining unit for superposing and combining the pair of object images produced by the producing unit into an image, and a display unit for displaying the image resulting from the combination by the image combining unit.

9 Claims, 21 Drawing Sheets

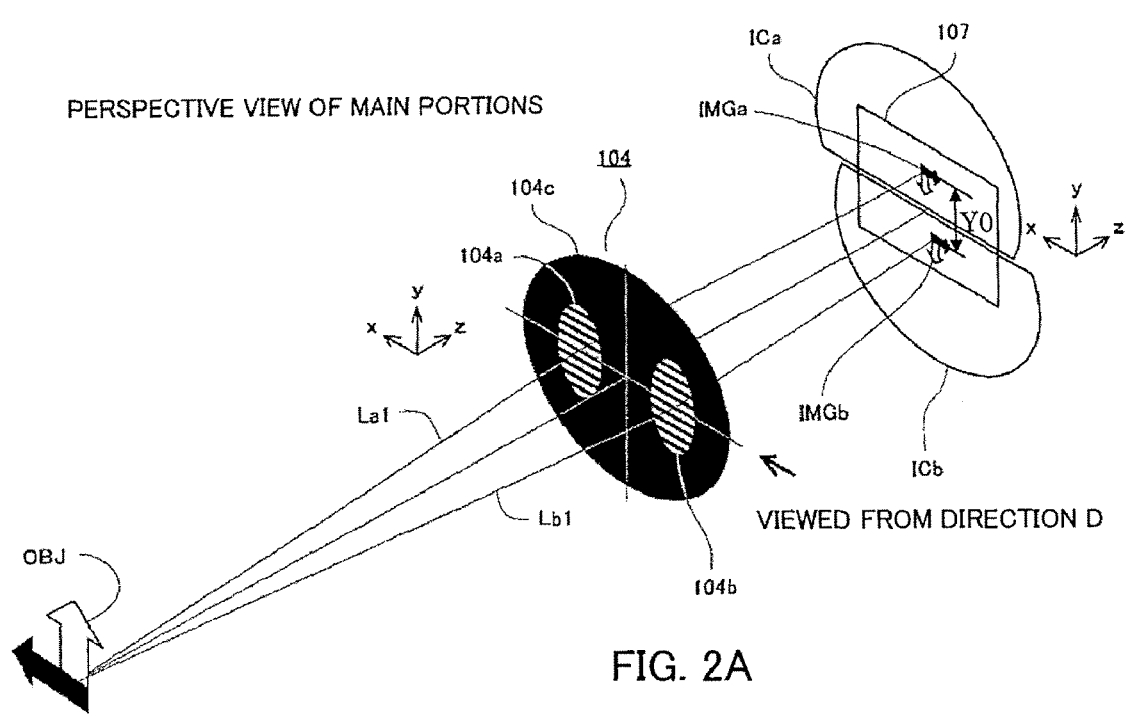
FIG. 2A
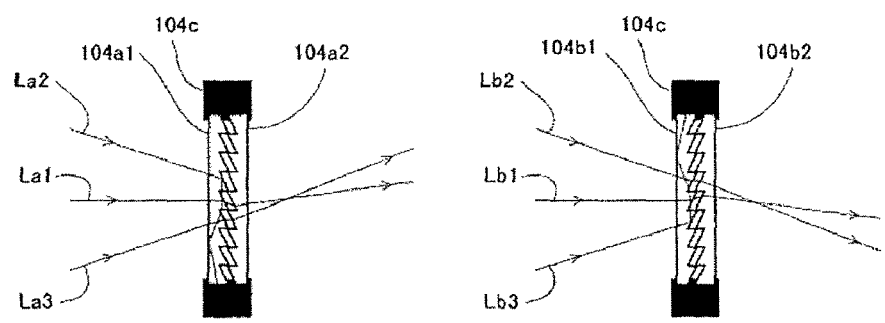
SEXTION VIEW OF PRISM 104a
FROM DIRECTION D
SEXTION VIEW OF PRISM 104b
FROM DIRECTION D
FIG. 2B
FIG. 2C

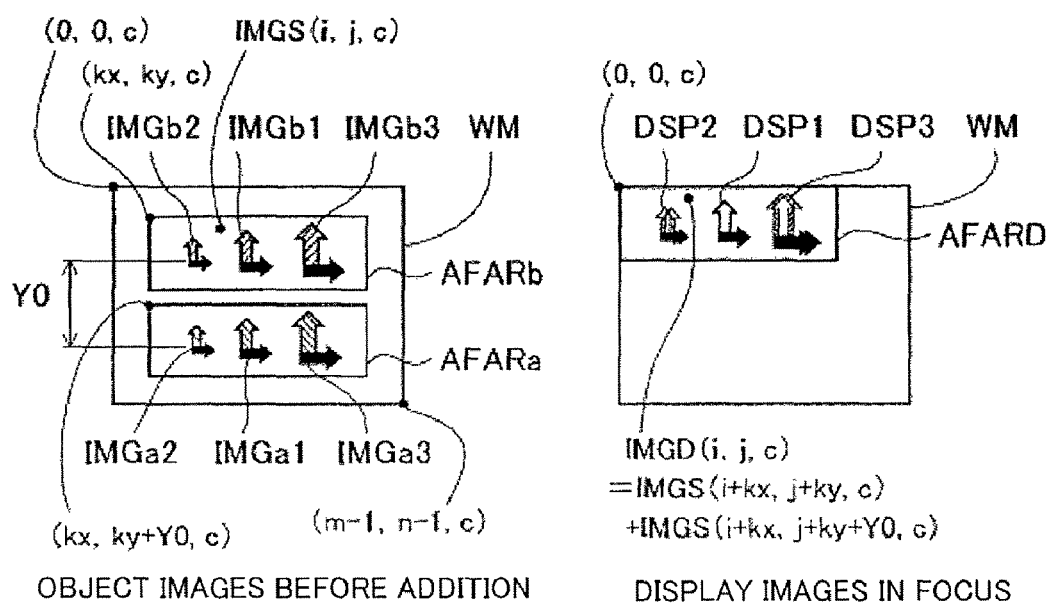
FIG. 6A  OBJECT IMAGES BEFORE ADDITION
FIG. 6B  DISPLAY IMAGES IN FOCUS

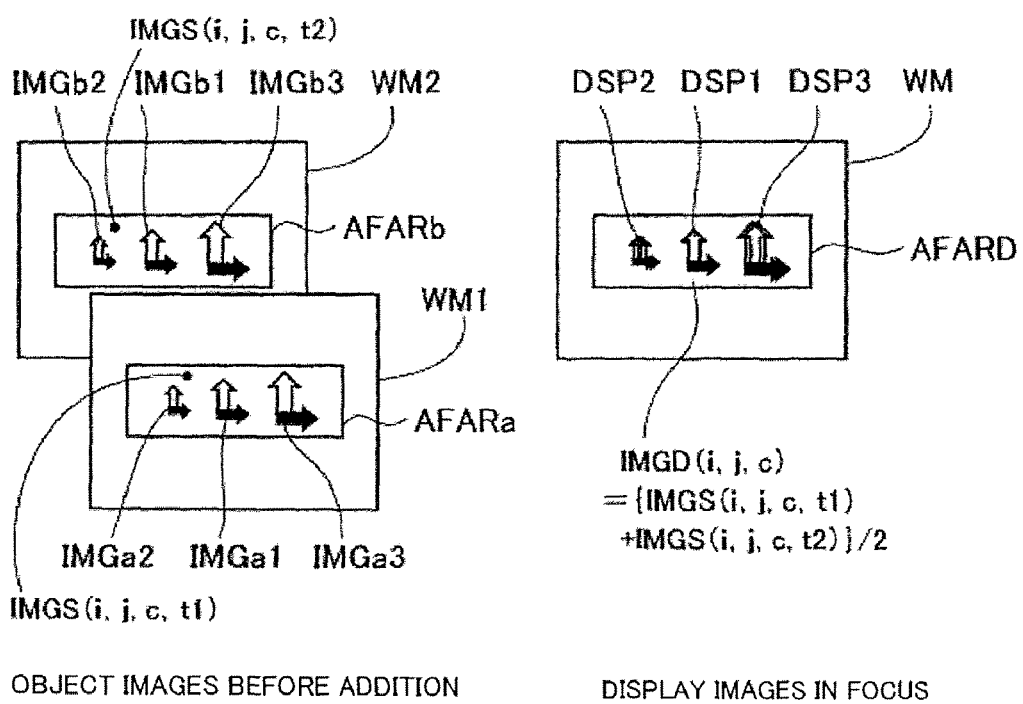
FIG. 13A — OBJECT IMAGES BEFORE ADDITION
FIG. 13B — DISPLAY IMAGES IN FOCUS

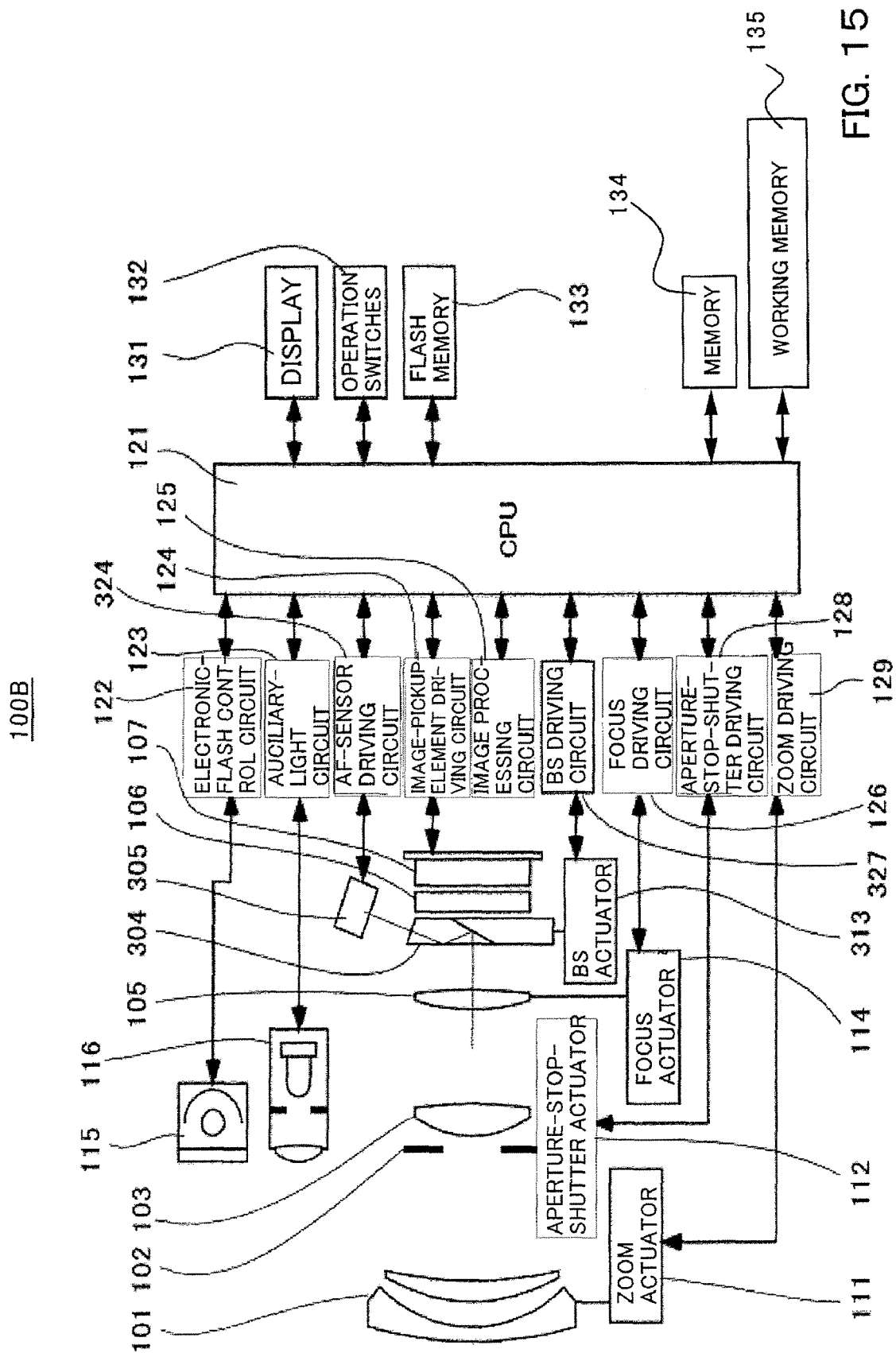

OBJECT IMAGES BEFORE ADDITION $IMGD(i, j, c)$
$= \{IMGS(i, j, c)$
$+IMGS(i+idef, j, c)\}/2$

DISPLAY IMAGES IN FOCUS

DISPLAY IMAGES IN REAR-FOCUS

DISPLAY IMAGES IN FRONT-FOCUS

OBJECT IMAGES BEFORE ADDITION

DISPLAY IMAGES IN FOCUS

DISPLAY IMAGES IN REAR-FOCUS

DISPLAY IMAGES IN FRONT-FOCUS

OBJECT IMAGES BEFORE ADDITION $IMGD(i, j, c)$
$=IMGS(i, j, c, 1)$
$+IMGS(i+idef, j, c, 2)$

DISPLAY IMAGES IN FOCUS

DISPLAY IMAGES IN REAR-FOCUS

DISPLAY IMAGES IN FRONT-FOCUS

IMAGE-PICKUP APPARATUS

BACKGROUND OF THE INVENTION

The present invention relates to an image-pickup apparatus, and more particularly, to an image-pickup apparatus which displays a focus state.

An electronic camera which records static images or moving images has an electronic display apparatus for presenting a preview image used in setting of composition, displaying a picked-up image, or assisting in setting of various image-pickup conditions. The electronic display apparatus includes an electronic viewfinder and a liquid crystal monitor. The electronic viewfinder is a device which is realized by placing a small image display element at a position where a typical optical viewfinder would be provided and allows a user to see an image through an eyepiece. The liquid crystal monitor is a flat-panel image display apparatus which has a relatively large screen, is placed at the exterior of a camera such as on the back and the side, and allows a user to see an image directly.

The electronic display apparatus is also used to check a focus state in the imaging time. The electronic display apparatus, however, typically has a low resolution, so that it is difficult for a user to accurately know the focus state if a preview image is presented as it is. To address this, various techniques have been proposed for improving the visibility of the focus state of the preview image (see, for example, Japanese Patent Laid-Open No. 2004-212891, Japanese Patent Laid-Open No. 11 (1999)-122517, Japanese Patent Laid-Open No. 2005-181373).

Other related arts include Japanese Patent Laid-Open No. 61(1986)-22316, Japanese Patent Laid-Open No. 9(1997)-184972, Japanese Patent Laid-Open No. 6(1994)-175015, Japanese Patent Laid-Open No. 2003-140246, and Japanese Patent Laid-Open No. 2000-2909.

In Japanese Patent Laid-Open No. 2004-212891, an image in a focus detection area is divided into two and the two images are shifted horizontally and displayed. It is difficult to accurately recognize such a horizontal shift for an image having a complicated shape. In Japanese Patent Laid-Open No. 11 (1999)-122517, two images are horizontally shifted in accordance with the difference between the two images by using triangulation. Since image-pickup systems for picking up the two images have different characteristics, the display quality is low when focus is achieved, and it is difficult to accurately recognize a small out-of-focus amount. Japanese Patent Laid-Open No. 2005-181373 includes an electronic viewfinder which presents a difference in focus evaluation value and the polarity thereof in two images before and after manual focusing operation. This prevents a user from seeing an object in a focus detection area and its focus state simultaneously. Thus, the user cannot know the focus state continuously while keeping track of a quickly moving object in the focus detection area.

SUMMARY OF THE INVENTION

The present invention provides an image-pickup apparatus which allows a user to accurately and easily know the out-of-focus amount for various images or objects.

According to one aspect, the present invention provides an image-pickup apparatus which comprises a producing unit for producing a pair of object images, the object images being displaced from each other in accordance with a displacement of the object from an in-focus position in an optical axis direction, an image combining unit for superposing and combining the pair of object images produced by the producing unit into an image, and a display unit for displaying the image resulting from the combination by the image combining unit.

Other objects and features of the present invention will become apparent from the following description of preferred embodiments with reference to the attached drawings.

BRIEF DESCRIPTION OF THE DRAWINGS

FIG. 2A is a schematic perspective view for explaining the principles of focus detection with a single object and the main portions of an image-pickup optical system shown in FIG. 1.

FIG. 2B is a section view of a first laminated prism shown in FIG. 2A when it is viewed from a direction D.

FIG. 2C is a section view of a second laminated prism shown in FIG. 2A when it is viewed from the direction D.

FIGS. 6A and 6B are plan views for explaining a third display method for display on the display shown in FIG. 1.

FIGS. 13A and 13B are plan views for explaining a first display method for display on a display shown in FIG. 11.

FIG. 15 is a block diagram schematically showing a camera according to Embodiment 3 of the present invention.

DESCRIPTION OF THE EMBODIMENTS

Preferred embodiments of the present invention will hereinafter be described with reference to the accompanying drawings.

First Embodiment

A camera 100 of Embodiment 1 of the present invention will hereinafter be described with reference to FIGS. 1 to 10.

Figure 1:
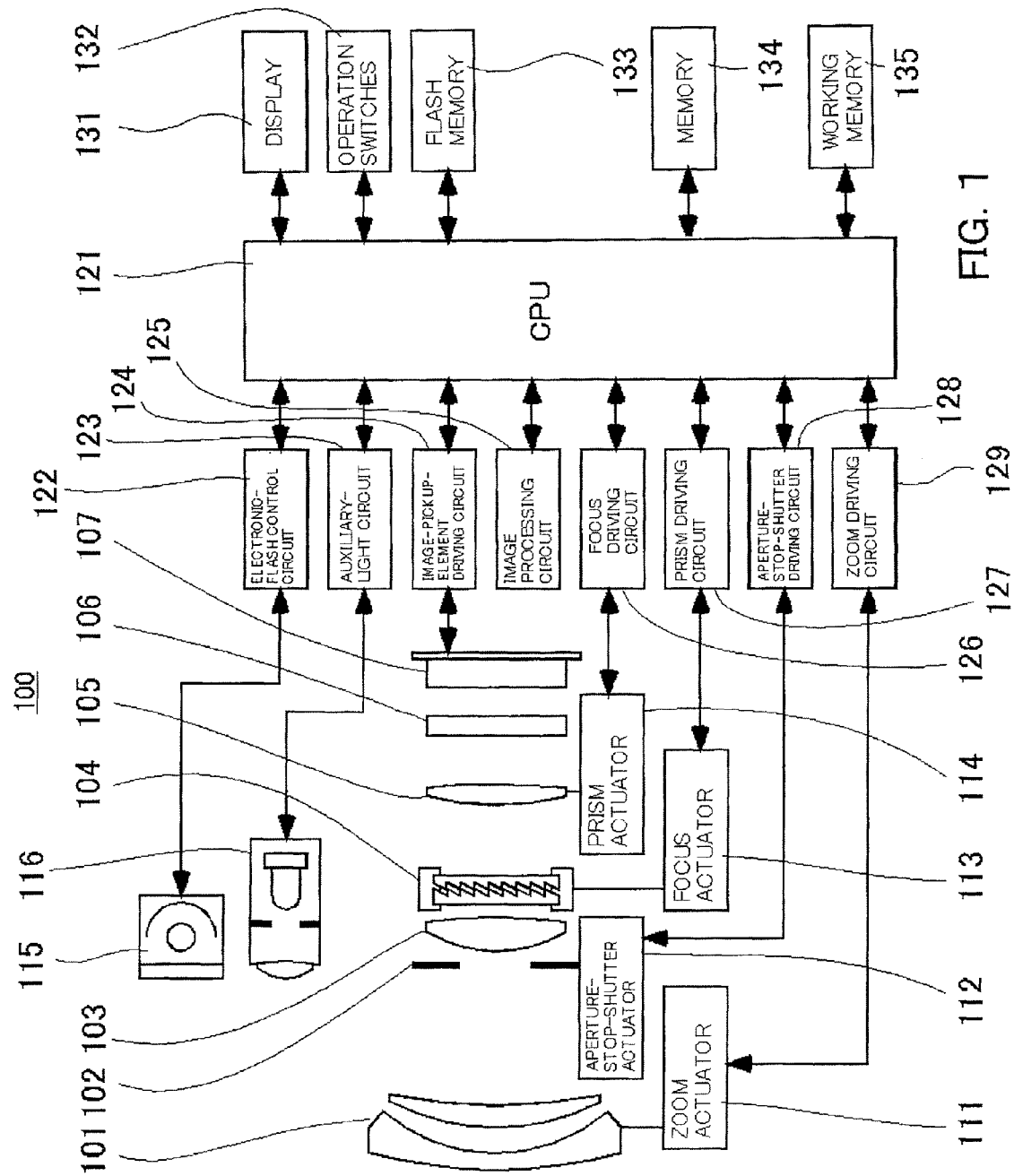
FIG. 1 is a block diagram schematically showing a camera according to Embodiment 1 of the present invention.

The camera 100 is an electronic camera including a camera body having an image-pickup element integral with an image-pickup lens. FIG. 1 is a block diagram schematically showing the camera 100.

In FIG. 1, reference numeral 101 shows a first lens unit placed at the end of an image-pickup optical system (image-forming optical system) and held to be movable in an optical axis direction. Reference numeral 102 shows a shutter doubling as an aperture stop. The aperture diameter of the shutter 102 is increased and reduced to adjust the amount of light in image pickup, and the shutter 102 also serves to adjust the exposure time when still images are picked up. Reference numeral 103 shows a second lens unit. Reference numeral 104 shows a prism unit including a light-flux deflecting element made of prism sheet and held to enter or retract from an image-pickup optical path. The shutter and aperture stop 102, the second lens unit 103, and the light-flux deflecting unit (prism unit) 104 are moved together in the optical axis direction and are associated with the forward and rearward movement of the first lens unit 101 in the optical axis direction to provide variable magnification (zoom function).

Reference numeral 105 shows a third lens unit which is moved in the optical axis direction to perform focus adjustment. Reference numeral 106 shows an optical low-pass filter which is an optical element for reducing false color and moire in picked-up images. Reference numeral 107 shows an image-pickup element formed of a CCD or a CMOR sensor and its peripheral circuits. The image-pickup element 107 is realized with a two-dimensional single-chip color sensor provided by forming a primary-color mosaic filter having the Bayer pattern on light-receiving pixels of n pixels long and m pixels wide.

Reference numeral 111 shows a zoom actuator which moves the components from the first lens unit 101 to the prism unit 104 in the optical axis direction by rotation on a cam barrel, not shown, to provide variable magnification. Reference numeral 112 shows an aperture-stop-shutter actuator which controls the aperture diameter of the shutter and aperture stop 102 to adjust the light amount in image pickup and to control the exposure time in picking up still images. Reference numeral 113 shows a prism actuator which causes the prism unit 104 to enter the image-pickup optical path in focus detection and causes the prism unit 104 to retract from the optical path at other times. Reference numeral 114 shows a focus actuator which drives the third lens unit 105 to move forward and rearward in the optical axis direction to perform focus adjustment.

Reference numeral 115 shows an electronic flash for illuminating an object in image pickup. A flash lighting device with a xenon tube is preferable for the flash 115, but an illumination apparatus including a continuously emitting LED may be used. Reference numeral 116 shows an autofocus (AF) auxiliary-light unit which projects the image of a mask having a predetermined opening pattern onto an object through a projection lens to improve the focus detection ability for a dark object or an object of a low contrast.

Reference numeral 121 shows a CPU responsible for various types of control in the camera body. The CPU 121 has an arithmetic part, ROM, RAM, A/D converter, D/A converter, communication interface circuit and the like. The CPU 121 drives various circuits in the camera 100 based on a predetermined program stored on the ROM to perform a series of operations including AF, image pickup, image processing, and recording.

Reference numeral 122 shows an electronic-flash control circuit which controls the lightening of the illumination unit 115 in synchronization with image-pickup operation. Reference numeral 123 shows an auxiliary-light driving circuit which controls the lightening of the AF auxiliary-light unit 116 in synchronization with focus detection operation. Reference numeral 124 shows an image-pickup-element driving circuit which controls image-pickup operation of the image-pickup element 107, and A/D converts an acquired image signal and transmits the converted signal to the CPU 121. Reference numeral 125 shows an image processing circuit which performs processing of the image acquired by the image-pickup element 107 such as gamma conversion, color interpolation, and JPEG compression.

Reference numeral 126 shows a focus driving circuit which controls the driving of the focus actuator 114 based on the result of focus detection to drive the third lens unit 105 forward and rearward in the optical axis direction to perform focus detection. Reference numeral 127 shows a prism control circuit which causes the prism unit 104 to enter and retract from the image-pickup light flux in association with focus detection operation. Reference numeral 128 shows a shutter driving circuit which controls the driving of the aperture-stop-shutter actuator 112 to control the aperture of the shutter and aperture stop 102. Reference numeral 129 shows a zoom driving circuit which drives the zoom actuator 111 in accordance with zoom operation performed by a user.

Reference numeral 131 shows a display such as an LCD which presents information about an image-pickup mode of the camera, a preview image before image pickup, a picked-up image for check, an image for showing a focus state in focus detection, and the like. Reference numeral 132 shows a group of operation switches formed of a power switch, release (image-pickup trigger) switch, zoom operation switch, image-pickup mode switch, and the like. Reference numeral 133 shows a removable flash memory for recording picked-up images. Reference numeral 134 shows memory for storing methods shown in FIGS. 7 to 10 as a program. Reference numeral 135 shows temporary memory or so-called working memory used when the image acquired by the image-pickup element 107 is subjected to various types of processing.

FIGS. 2A to 2C are diagrams for explaining the principles of focus detection in Embodiment 1. FIG. 2A is a perspective view showing the main portions. FIGS. 2B and 2C are section views of the prism unit. FIG. 2A shows only the main portions of the image-pickup optical system in focus detection, that is, the prism unit 104 and the image-pickup element 107. The lens units for forming an image and the optical low-pass filter are omitted in FIG. 2A. The prism unit 104 has a first laminated prism 104a, a second laminated prism 104b, and a light-shield plate 104c. The light-shield plate 104c has two oval openings of the same size and shape having the major axis in the vertical direction at the two positions side by side symmetrical with respect to the center. The first laminated prism 104a is embedded in one of the openings, while the second laminated prism 104b is embedded in the other.

OBJ shows an object placed on the optical axis of the image-pickup optical system. A light flux travels from the object OBJ, enters the first laminated prism 104a, and then is converted by the lens units, not shown, subjected to the light-flux deflecting effect of the prism 104a, later described, and forms a first object image IMGa in an upper area of the image-pickup element 107. In a similar manner, a light flux travels from the object OBJ, enters the second laminated prism 104b, and then forms a second object image IMGb in a lower area of the image-pickup element 107.

FIG. 2B is a section view of the first laminated prism 104a when it is viewed from a direction D in FIG. 2A. The prism 104a has a light-flux limiting prism 104a1 placed on the entrance side and a light-flux deflecting prism 104a2 placed on the exit side. The light-flux limiting prism 104a1 is a prism sheet which has a planar shape on the entrance-surface side (first surface) and a jagged shape of regularly formed sawtooth prism elements on the exit-surface side (second surface). The light-flux deflecting prism 104a2 is a prism sheet which has a jagged shape of regularly formed sawtooth prism elements on the entrance-surface side (first surface) and a planar shape on the exit-surface side (second surface). Each of the two prism sheets is formed through injection molding of an optical resin. A low-refractive-index resin is selected for the light-flux limiting prism 104a1, while a high-refractive-index resin is selected for the light-flux deflecting prism 104a2. The reasons therefor will next be described.

A light flux La1 enters the first laminated prism 104a perpendicularly to its entrance surface, passes through the light-flux limiting prism 104a1 and is deflected downward thereby, and then passes through the light-flux deflecting prism 104a2 and is deflected in the opposite direction thereby. Since the light-flux deflecting prism 104a2 has a relatively high refractive index, the deflecting effect of the prism 104a2 is larger than that of the prism 104a1 to cause the light flux to emerge upward from the prism 104a. On the other hand, a light flux La2 enters the first laminated prism 104a from an upper direction to the entrance surface and is totally reflected by the sawtooth exit surface of the light-flux limiting prism 104a1, so that the light flux La2 cannot emerge toward the image-pickup element. A light flux La3 enters the first laminated prism 104a from a lower direction to the entrance surface and is subjected to the refraction effect similar to that on the light flux La1. Thus, the light flux La3 is deflected upward when it emerges from the prism 104a.

As described above, the light-flux limiting prism 104a1 totally reflects a light flux at an angle other than the particular incident angle to prevent transmission thereof, and the light-flux deflecting prism 104a2 deflects a light flux which was not totally reflected but passed through the light-flux limiting prism 104a1 in the predetermined direction. These actions result in the effective area of an image formed by the light flux which passed through the first laminated prism 104a, a so-called image circle, having a shape defined by linearly removing a negative portion on a y axis, as shown by ICa in FIG. 2A.

FIG. 2C is a section view of the second laminated prism 104b when it is viewed from the direction D in FIG. 2A. The prism 104b has a shape formed by vertically (in the y axis direction) inverting the first laminated prism described in FIG. 2B. A light-flux limiting prism 104b1 has the same refractive index as that of the prism 104a1, while a light-flux deflecting prism 104b2 has the same refractive index as that of the prism 104a2.

A light flux Lb1 enters the second laminated prism 104b perpendicularly to its entrance surface, and is deflected downward when it emerges from the prism 104b. A light flux Lb2 enters the second laminated prism 104a from an upper direction to the entrance surface, and is deflected downward with respect to the entrance direction when it emerges from the prism 104b. On the other hand, a light flux Lb3 enters the second laminated prism 104b from a lower direction to the entrance surface and is totally reflected by the sawtooth exit surface of the light-flux limiting prism 104b1, so that the light flux Lb3 cannot emerge toward the image-pickup element.

This results in the effective area of an image formed by the light flux which passed through the second laminated prism 104b, a so-called image circle, having a shape defined by linearly removing a positive portion on the y axis, as shown by ICb in FIG. 2A.

As described above, the two image circles formed through the image-pickup optical system and the two prisms 104a and 104b have the shapes in which the different portions are removed. The separate object images IMGa and IMGb are formed in the upper and lower halves of the image-pickup element 107, respectively, to prevent the two images from overlapping. A vertical interval Y0 between the two images is determined by the optical state (zoom state and focus state) of the image-pickup optical system and the light-flux deflecting powers of the laminated prisms. Each image circle is used as a focus detection area, and the relative positions in an x-axis direction of the object images IMGa and IMGb projected in the focus detection areas are detected, thereby making it possible to detect the focus state of the image-pickup optical system for the object OBJ.

FIGS. 2A to 2C show the focus detection principles when the single object OBJ is used. Next, description will be made of the focus state for a plurality of objects placed at different distances from the camera 100 and image display forms on the display 131 in focus detection with reference to FIGS. 3 to 5.

Figure 3:
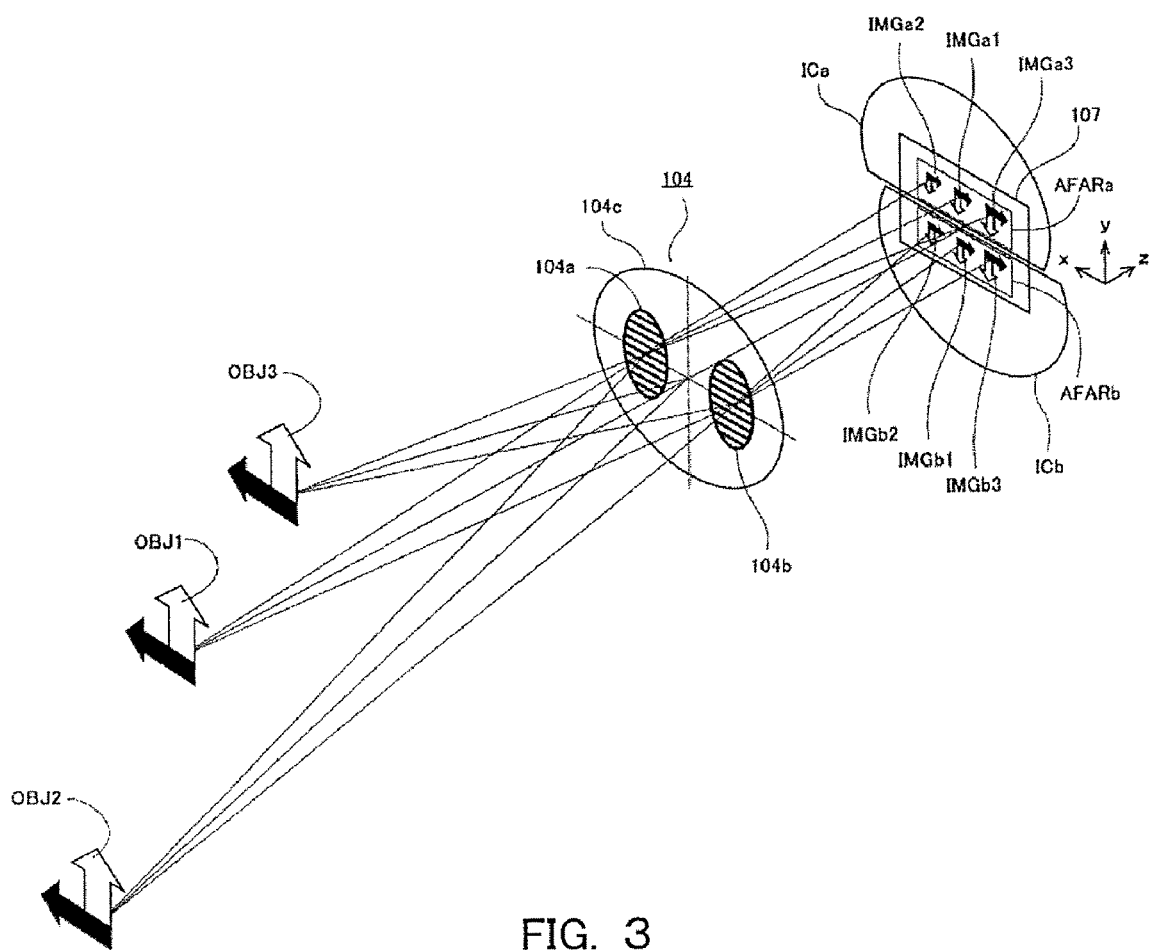
FIG. 3 is a schematic perspective view for explaining the principles of focus detection with a plurality of objects and the main portions of the image-pickup optical system shown in FIG. 1.

FIG. 3 is a perspective view showing the prism unit 104 and the image-pickup element 107 constituting the main portions of the image-pickup optical system, together with three objects OBJ1, OBJ2, and OBJ3 placed at different distances. The OBJ1 is a first object at an intermediate distance on the optical axis of the image-pickup optical system and is assumed as a main object. The OBJ2 is a second object at a longer distance offset from the image-pickup optical axis. The OBJ3 is a third object at a shorter distance offset from the image-pickup optical axis opposite to the second object. Light fluxes from the three objects pass through the two laminated prisms 104a and 104b of the prism unit 104 and are projected as six object images IMGa1 to IMGb3 onto the image-pickup element 107 based on the principles described in FIG. 2.

FIGS. 4A to 4D are diagrams for explaining a first display method for display on the display 131 in focus adjustment. As later described, Embodiment 1 allows selection from a plurality of display methods, and FIGS. 4A to 4D shows the first one of the display methods. A user can select any of the display methods with the group of operation switches 132.

FIGS. 4A to 4D are diagrams for explaining processing steps in the working memory 135. WM shows an image storing area in the working memory 135. Three image storing areas for primary colors, R, G, and B, are provided, and each area has a working area formed of n pixels long and m pixels wide. The coordinates of each working memory 135 are defined as (i, j, c), where i represents the coordinate in the horizontal direction and j represents the coordinate in the vertical direction with the upper left point as the original, and c represents color information and corresponds to a memory area for storing the information of the primary colors of R (Red), G (Green), and B (Blue). FIGS. 4A to 4D show one of the three working areas, and the remaining two are omitted.

Figure 4A:
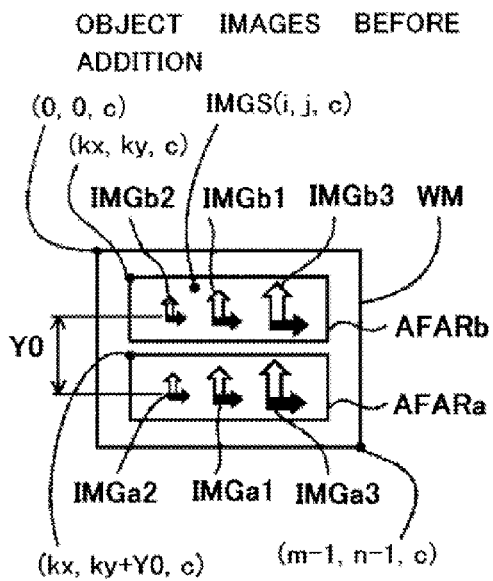
FIGS. 4A to 4D are plan views for explaining a first display method for display on a display shown in FIG. 1.

FIG. 4A shows an image acquired in focus detection and developed on the area WM for image processing. FIG. 4A shows the image for convenience, but actually, the image signal at an arbitrary position in the area WM is represented by IMGS(i, j, c), and its numeral value is represented by 8 bit information, that is, a numeral value from 0 to 255.

In FIG. 4A, the object image formed by the light flux which passed through the first prism unit 104a is developed in a focus detection area AFARa. Specifically, three object images IMGa1 to IMGa3 and their backgrounds are projected thereon. Each object image is an upward white arrow and a rightward black arrow and the background is assumed to be gray in color, but the background is presented in white for convenience in FIGS. 4A to 4D.

Similarly, object images IMGb1 to IMGb3 formed by the light flux which passed through the second prism unit 104b and their backgrounds are developed in a focus detection area AFARb. The object images IMGa1 to IMGa3 and the object images IMGb1 to IMGb3 are projected with the interval Y0 (in pixels) between them in the vertical direction, that is, in the y axis direction as described in FIG. 2A. When the coordinates of the upper left point of the focus detection area AFARb are represented by (kx, ky, c), the coordinates of the upper left point of the focus detection area AFARa are represented by (kx, ky+Y0, c).

Next, the processing method of the two sets of images in the first display method will hereinafter be described. In the first method, the images projected onto the two areas undergo the same image processing as the processing for ordinary picked-up images and then additional processing. Specifically, for the images in the focus detection areas AFARa and AFARb of FIG. 4A, an image signal output from the single-chip color sensor having the Bayer pattern is subjected to a predetermined algorithm to produce an RGB full-color image. The two sets of images in the areas have equivalent color information and also have parallax information representing the different relative horizontal positions of the images of the plurality of objects at the different distances.

Figure 4B:
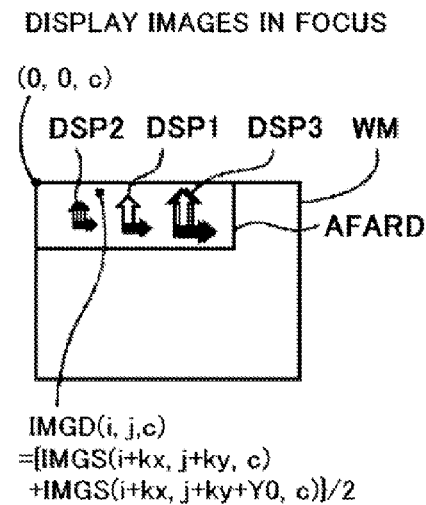
Figure 4C:
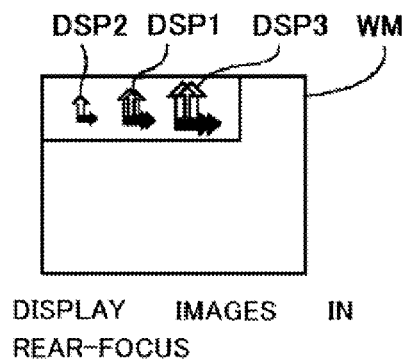
Figure 4D:
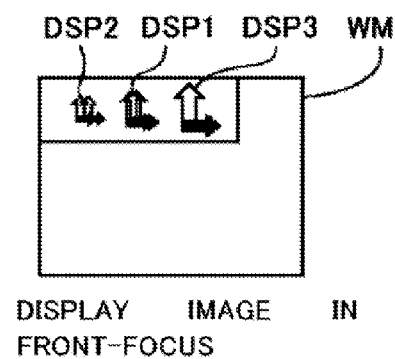

FIGS. 4B to 4D show images after the images developed on the area WM shown in FIG. 4A are subjected to arithmetic processing for display on the display 131. While the definitions of the coordinates in FIGS. 4B to 4D are identical to those in FIG. 4A, an image signal at an arbitrary point is represented by IMGD(i,j,c). In the first display method, an image IMGD for display is produced by adding the image signals IMGS at the corresponding pixels in the images projected onto the two focus detection areas according to an expression 1.

$$IMGD(i,j,c)=\{IMGS(i+kx,j+ky,c)+IMGS(i+kx,j+ky+Y0,c)\}/2 \quad \text{EXPRESSION 1}$$

In other words, the image for display is provided by averaging the two images having parallax information.

FIG. 4B shows images for display produced from the images in FIG. 4A through the arithmetic calculation of the expression 1 when the first object OBJ1 at the intermediate distance is in focus. In FIG. 4B, the images in an upper left area AFARD in the area WM are presented on the display 131.

In FIG. 4A, two images IMGa1 and IMGb1 of the in-focus object OBJ1 have the same horizontal coordinates. Thus, the image IMGD(i,j,c) provided through the arithmetic calculation of the expression 1 is identical to the original images IMGS(i,j,c) and the IMGS(i,j+Y0,c). An object DSP1 shown at the center in FIG. 4B is presented as an ordinary single image without blurring.

On the other hand, the two images IMGa2 and IMGb2 of the out-of-focus second object OBJ2 have different horizontal coordinates. Thus, the arithmetic calculation of the expression 1 on the two images leads to presentation of a double image with a slight displacement in the horizontal direction as shown by an object image DSP2 of FIG. 4B. Similarly, the two images IMGa3 and IMGb3 of the out-of-focus third object OBJ3 have different horizontal coordinates. The arithmetic calculation of the expression 1 on the two images causes presentation of a double image with a slight displacement in the horizontal direction as shown by an object image DSP3 of FIG. 4B.

FIG. 4C shows images for display when the second object OBJ2 at the longer distance is in focus, that is, when focus is achieved rearward of the main object OBJ1 at the center. In this state, an image DSP2 for display of the in-focus object OBJ2 is presented as an ordinary single image without blurring. On the other hand, since the object image OBJ1 is slightly out of focus, an image DSP1 for display thereof is presented as a double image with a slight displacement in the horizontal direction. Since the third object OBJ3 is largely out of focus, an image DSP3 for display thereof is presented as a double image with a relatively large displacement in the horizontal direction.

FIG. 4D shows images for display when the third object OBJ3 at the shorter distance is in focus, that is, when focus is achieved forward of the main object OBJ1 at the center. In this state, an image DSP3 for display of the in-focus object OBJ3 is presented as an ordinary single image without blurring. On the other hand, since the object image OBJ1 is slightly out of focus, an image DSP1 for display thereof is presented as a double image with a slight displacement in the horizontal direction. Since the second object OBJ2 is largely out of focus, an image DSP2 for display thereof is presented as a double image with a relatively large displacement in the horizontal direction.

As described above, in the first display method explained in FIGS. 4A to 4D, the in-focus object is presented as the ordinary image, while the out-of-focus object is presented as the double image with the horizontal displacement. The displacement of the displayed image is proportional to the out-of-focus amount or the defocus amount. This allows a user to easily know the focus state of the object.

FIGS. 5A to 5D show a second display method for display on the display 131 in focus adjustment. The coordinates of the area WM and the definitions of various images signals are identical to those described in FIGS. 4A to 4D. The first method involves averaging the two sets of images having parallax information to present the out-of-focus image as the double image. In contrast, the second display method involves inverting one of images and adding the inverted image to the other image to eliminate contrast or color information of an image in an in-focus area, thereby providing a characteristic effect for an image in an out-of-focus area.

Figure 5A:
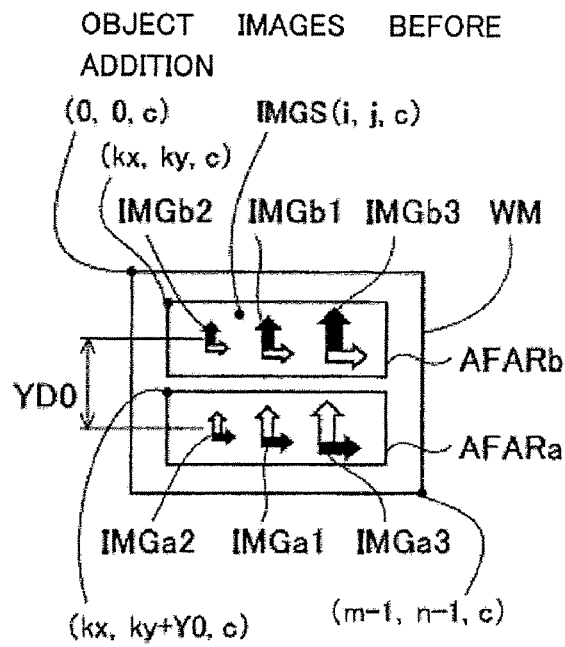
FIGS. 5A to 5D are plan views for explaining a second display method for display on the display shown in FIG. 1.

FIG. 5A corresponds to FIG. 4A except that each color information of RGB is inverted in each image in the upper focus detection area AFARb in FIG. 5A. The inversion processing is performed according to an expression 2.

$$IMGS(i,j,c) \leftarrow 255 - IMGS(i,j,c) \quad \text{EXPRESSION 2}$$

A leftward arrow in the expression 2 represents the substitution of the calculation result on the right side into the left side, and c represents each color of RGB as in the first display method. The processing inverts the color information of the images in the area AFARb to produce color images which have complementary colors to those in the original image.

The conversion of all of the RGB components in the images causes conversion of the luminance components in the images. In FIG. 5A showing the object image as the white and black arrows, the white and black arrows are converted into the black and white arrows, respectively, and the gray background remains gray after the conversion. A green object is converted into the complementary color, magenta, and a blue object is converted into the complementary color, yellow. In other words, the abovementioned processing converts the image in the area AFARa in the area WM into the image converted from the original full-color image, and converts the image in the area AFARb into the image having the converted color information in the original image, that is, the full-color image after the complementary-color conversion.

Figure 5B:
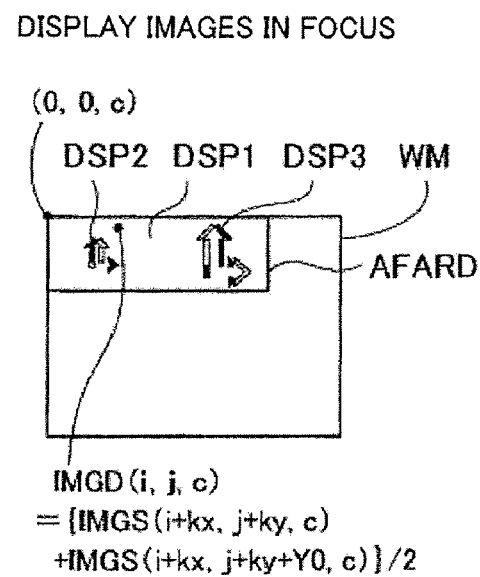
Figure 5C:
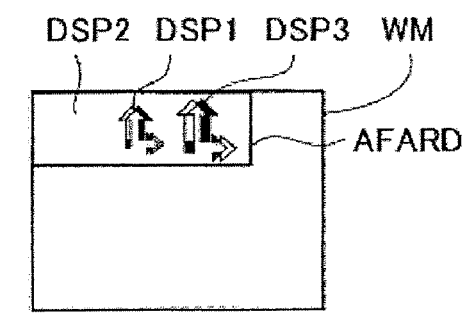
Figure 5D:
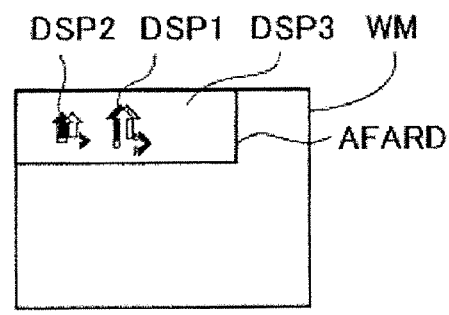

FIGS. 5B to 5D correspond to FIGS. 4B to 4D and show images after the images developed on the area WM shown in FIG. 5A are subjected to arithmetic processing for display on the display 131. Similarly to FIGS. 4B to 4D, an image signal at an arbitrary point is represented by IMGD(i,j,c). In the second display method, an image IMGD for display is produced by performing the color processing according to the expression 2 on one of the original images and then adding the image signals IMGS at the corresponding pixels in the images projected onto the two focus detection areas according to the expression 1 similarly to the first display method. The color conversion and addition of the one image to the other is equivalent to calculation of the absolute value of the difference in color information between the two images.

FIG. 5B shows images for display produced from the images in FIG. 5A through the arithmetic calculation of the expression 2 when the first object OBJ1 at the intermediate distance is in focus.

In the second display method, one of the images is color-converted and added to the other image. If the two original images have no parallax and are the same image, the image resulting from the addition is uniformly gray. In other words, the image DSP1 for display of the in-focus object at the center is blended into the background gray and disappears. On the other hand, for the out-of-focus second object, the two images before the addition have parallax and are shifted horizontally, so that the image resulting from the addition is not uniformly gray. Since the luminance and color information are generally changed abruptly in an edge portion of an object, addition of two images having parallax causes the difference information of the two images to appear in the edge portion and gray areas to appear other than in the edge portion. Thus, the images DSP2 and DSP3 for display of the out-of-focus object OBJ2 and OBJ3 contain abrupt changes in luminance and color at their edge portions. Such an image includes a so-called embossing effect with pseudo light and dark portions in the outline.

FIG. 5C shows images for display when the second object OBJ2 at the longer distance is in focus. Focus is achieved slightly rearward of the main object OBJ1 at the center and significantly rearward of the object OBJ3 at the shorter distance on the right. In the display image DSP2 of the in-focus object OBJ2, image information disappears. For the other two objects, the embossing effect appears in accordance with the out-of-focus amount or the defocus amount.

FIG. 5D shows images for display when the third object OBJ3 at the shorter distance is in focus. Focus is achieved slightly forward of the main object OBJ1 at the center and significantly forward of the object OBJ2 at the longer distance on the left. In the display image DPS3 of the in-focus object OBJ3, image information disappears. For the other two objects, the embossing effect appears in accordance with the out-of-focus amount or the defocus amount.

As described above, in the second display method explained in FIGS. 5A to 5D, the in-focus object is presented as the uniformly gray image with the color information lost and the luminance change disappearing. On the other hand, the out-of-focus object shows the embossing effect with the abrupt change in the luminance and color appearing at the edge portion. The embossing effect is proportional to the out-of-focus amount or the defocus amount. This allows a user to easily know the focus state of the object by determining the degree of the embossing effect.

FIGS. 6A and 6B show a third display method in Embodiment 1. The coordinates of the area WM and the definitions of various images signals are identical to those in FIGS. 4A to 4D and FIGS. 5A to 5D. The second display method involves color-inverting one of the images having parallax information and adding the inverted image to the other image to present the edge portion in the out-of-focus area with the embossing effect. In contrast, the third method involves converting one of the images into a mono-color image of a first hue and the other into a mono-color image of a second hue and then adding them. The operation results in display of a mono-color image of a third hue in an in-focus area and display of a double image including the first or second hue partially remaining in an out-of-focus area.

FIG. 6A corresponds to FIG. 4A except that each image in the lower focus detection area AFARa is converted into a mono-color image of G (green) in FIG. 6A. The conversion processing is performed in the following procedure. First, RGB signals at the pixels are converted into luminance Y, color difference R-Y, and color difference B-Y according to an expression 3.

$$\begin{pmatrix} [Y](i, j) \\ [R-Y](i, j) \\ [B-Y](i, j) \end{pmatrix} = \begin{pmatrix} C11 & C12 & C13 \\ C21 & C22 & C23 \\ C31 & C32 & C33 \end{pmatrix} \begin{pmatrix} IMGS(i, j, R) \\ IMGS(i, j, G) \\ IMGS(i, j, B) \end{pmatrix} \quad \text{EXPRESSION 3}$$

C11 to C33 represent conversion coefficients. Then, each color component of an image signal IMGS is substituted as follows.

$$\begin{pmatrix} IMGS(i, j, R) \\ IMGS(i, j, G) \\ IMGS(i, j, B) \end{pmatrix} = \begin{pmatrix} 0 \\ 1 \\ 0 \end{pmatrix} \begin{pmatrix} [Y](i, j) \\ [Y](i, j) \\ [Y](i, j) \end{pmatrix} \quad \text{EXPRESSION 4}$$

Specifically, the luminance value is substituted into the G component and zero is substituted into the R and B components to convert the original image into a mono-color image of green. Images in the upper focus detection area AFARb in FIG. 6A are converted into a mono-color image of M (magenta). The conversion processing is performed in the following procedure. First, RGB signals at the pixels are converted into luminance Y, color difference R-Y, and color difference B-Y according to an expression 4. Then, each color component of an image signal IMGS is substituted as follows.

$$\begin{pmatrix} IMGS(i, j, R) \\ IMGS(i, j, G) \\ IMGS(i, j, B) \end{pmatrix} = \begin{pmatrix} 1 \\ 0 \\ 1 \end{pmatrix} \begin{pmatrix} [Y](i, j) \\ [Y](i, j) \\ [Y](i, j) \end{pmatrix} \quad \text{EXPRESSION 5}$$

Specifically, the luminance value is substituted into the R and B components and zero is substituted into the G component to convert the original image into a mono-color image of magenta which is the complementary color of green. In this manner, the above-mentioned processing converts the image in the area AFARa in the area WM into the mono-color image of green which is the first hue and converts the image in the area AFARb into the mono-color image of magenta which is the second hue.

FIG. 6B corresponds to FIGS. 4B and 5B and shows images after the images developed on the area WM shown in FIG. 6A are subjected to arithmetic processing for display on the display 131. As in FIG. 4B, an image signal at an arbitrary point is represented by IMGD(i,j,c). In the third display method, one of the original images is converted into a mono-color image of the first hue, while the other is converted into a mono-color image of the second hue. Then, the image signals IMGS at the corresponding pixels in the images projected onto the two focus detection areas are added according to the expression 1 similarly to the first display method to produce an image IMGD for display.

FIG. 6B shows images for display when the first object OBJ1 at the intermediate distance is in focus. In the third display method, the two images of the complementary colors are added. If the original images have no parallax, the image resulting from the addition is an achromatic, monochrome image.

On the other hand, for the out-of-focus second object OBJ2 and third object OBJ3, the two images before the addition have parallax and are shifted horizontally, so that the image after the addition is not a simple monochrome image. As described in the second display method, the luminance and color information are changed abruptly in an edge portion of an object. Addition of two mono-colored images having parallax causes the luminance difference information of the two images to remain in the original mono-color hue at the edge portion of the resulting image. Thus, the images DSP2 and DSP3 for display of the out-of-focus object OBJ2 and OBJ3 include green or magenta outlines in their edger portions. While the complementary green and magenta are selected as the hues of the mono-color images before the addition, another combination of hues in the substantially complementary relationship may be used. When the original images are in the complementary colors, the hue after the addition is achromatic or mono-color.

If two colors not in the complementary relationship are selected as the hues of the original images, the image after the addition is a mono-color image of a third hue. For example, when the image in the lower focus detection area AFARa is converted into a mono-color image of G (green) and the image in the upper focus detection area AFARb is converted into a mono-color image of R (red), the image resulting from the addition of the two images is a mono-color image of Ye (yellow). Such a combination of colors may be used. In this case, a combination of hues not close to each other is preferable in the two images to achieve high visibility of the focus state.

Figures corresponding to FIGS. 4C and 4D are omitted. As described above, the third display method explained in FIGS. 6A and 6B involves converting the one image into the mono-color image of the first hue and the other image into the mono-color image of the second hue, adding the images, and presenting the image on the display, as described above. The in-focus object is presented as the mono-color image of the third hue. On the other hand, the out-of-focus object contains the outline of the first or second hue in the edge portion of the mono-color image presented in the third hue. The thickness of the outline is proportional to the out-of-focus amount or the defocus amount. This allows a user to easily know the focus state of the object by checking the thickness of the outline.

In a modification of the second display method shown in FIGS. 5A to 5D, a monochrome image and the inverted image thereof may be averaged and displayed, while one of the images is color-converted in the second display method. The modification may be performed in the following procedure.

First, the luminance Y of each original image in FIG. 5A is determined according to the expression 4. Then, the determined luminance Y is substituted into each color information of RGB of the original image. The original image is apparently monochromated in this manner. Next, for the images in the upper focus detection area AFARb, conversion is performed according to the expression 2 for each color of RGB to invert the monochrome image. The monochrome image in the focus detection area AFARa and the monochrome inverted image in the focus detection area AFARb are averaged to perform display as in FIG. 4B and afterward.

According to the modification, an in-focus object provides a uniformly gray image with the luminance change disappearing. On the other hand, an out-of-focus object presents a monochrome embossing effect in the edge portion. The embossing effect is proportional to the out-of-focus amount or the defocus amount. This allows a user to easily know the focus state of the object by determining the degree of the embossing effect.

FIGS. 7 to 10 are flow charts for explaining the steps of displaying a focus state in the camera of Embodiment 1. The control flow in FIGS. 7 to 10 will hereinafter be described with reference to FIGS. 1 to 6.

Figure 7:
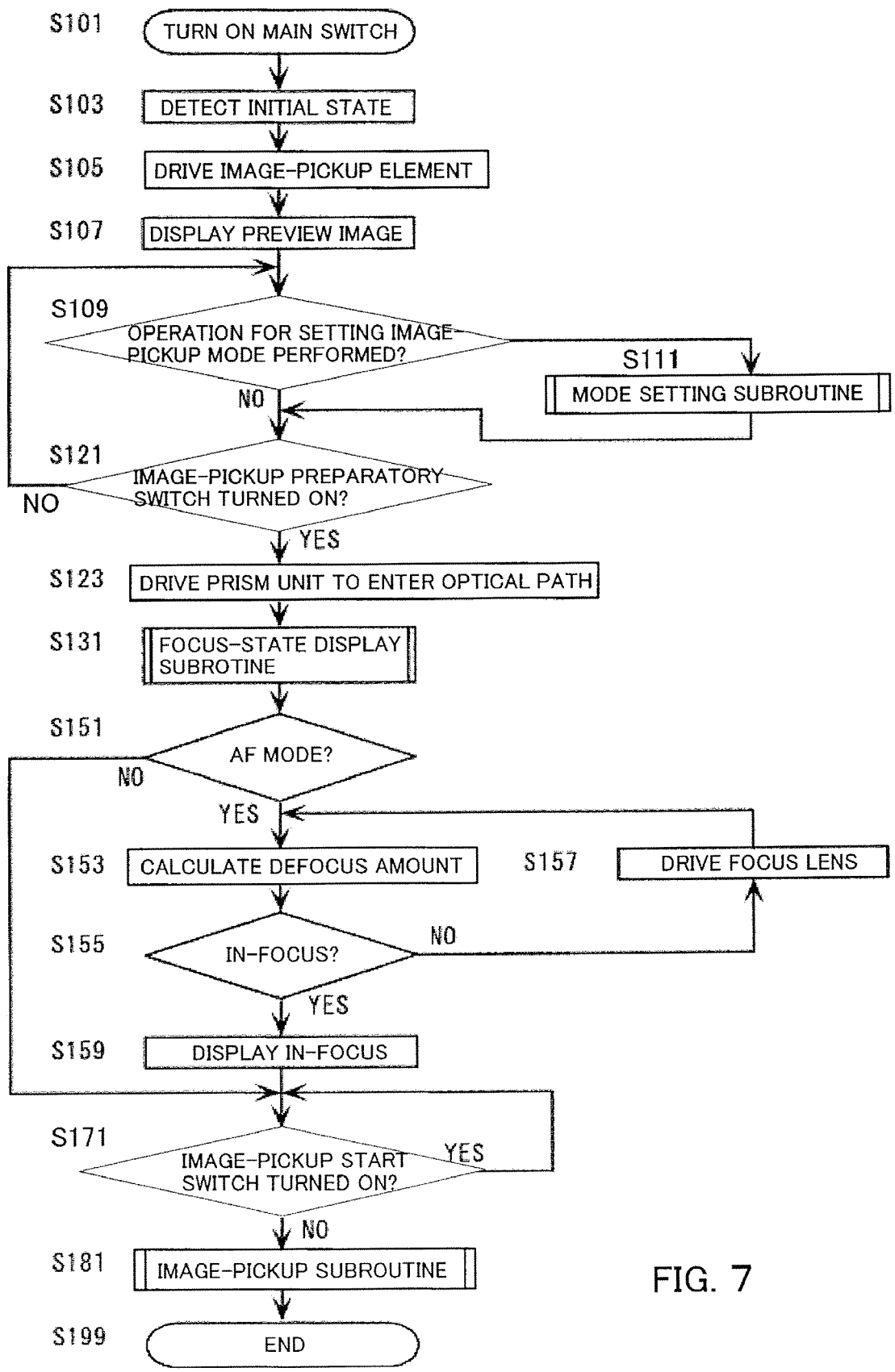
FIG. 7 shows a flow chart showing main control in Embodiment 1.

FIG. 7 is a main flow in the camera of Embodiment 1. First, a user turns on the power switch of the group of operation switches 132 of the camera 100 (step S101). In response thereto, the CPU 121 checks the operations of the actuators and the image-pickup element 107 in the camera, initializes the memory and the execution program, and performs preparatory operation for image pickup at step S103. At step S105, the image-pickup operation of the image-pickup element 107 is started, and a low-resolution moving image is output for preview. At step S107, the read moving image is presented on the display 131 provided on the back of the camera, and the user sees the preview image to set the composition for picking up images. At step S109, it is determined whether or not the user has selected the image-pickup mode with the group of operation switches 132. If the user has selected it, the control jumps to a mode setting subroutine at step S111.

Figure 8:
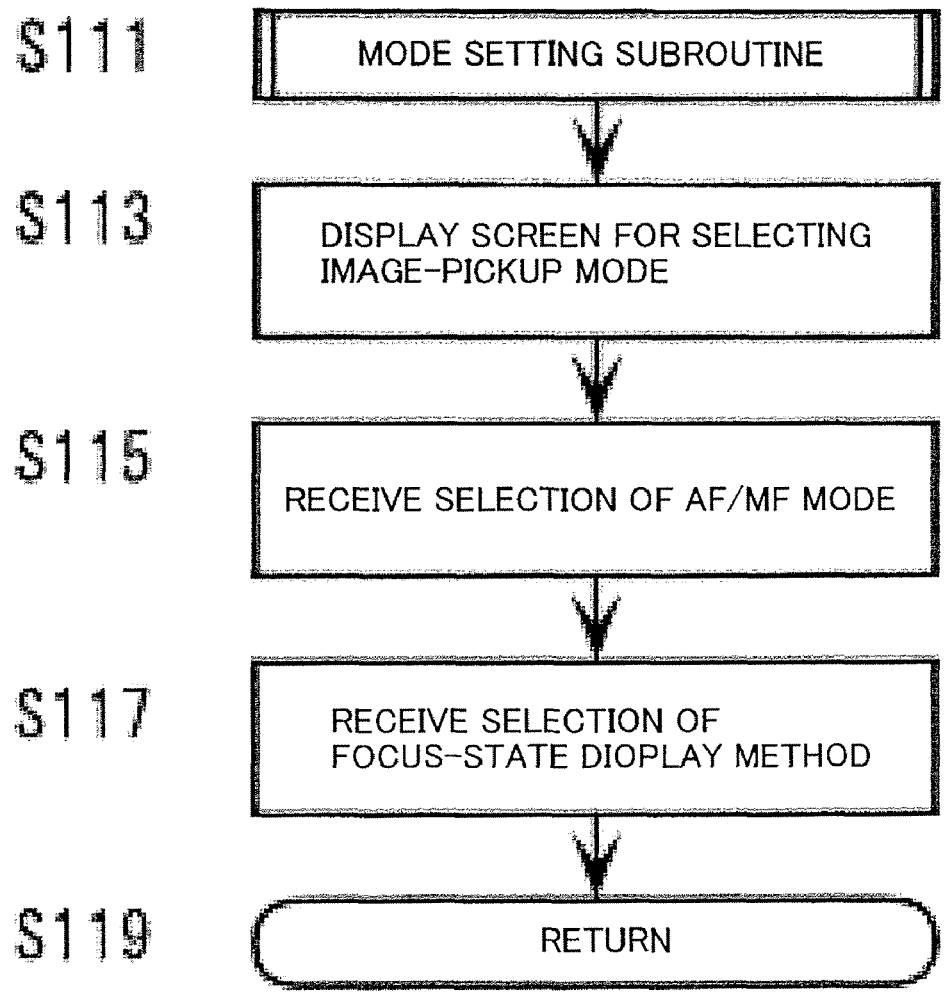
FIG. 8 shows a flow chart showing a mode setting subroutine shown in FIG. 7.

FIG. 8 is a flow chart of the mode setting subroutine. When the control jumps to step S111 of the subroutine from step S109 of the main flow, the display of the moving image for preview on the display 131 is switched to the display of a screen for setting various image-pickup modes of the camera at step S113. At step S115, an entry is received for selecting an AF (auto-focus) mode or MF (manual-focus) mode for focus adjustment. At step S117, an entry is received for selecting one of the focus-state display methods described in FIGS. 4 to 6 for focus detection. After the selection operations, the control returns to step S121 of the main flow in FIG. 7 via step S119.

At step S121 of the main flow, it is determined whether or not an image-pickup preparatory switch has been turned on. If it has not been turned on, the control returns to step S109 to maintain the standby state for mode setting operation. If the image-pickup preparatory switch has been turned on at step S121, the control proceeds to step S123. At step S123, the prism unit 104 shown in FIG. 1 is driven to enter the image-pickup optical path. At step S131, a focus-state display subroutine is performed.

Figure 9:
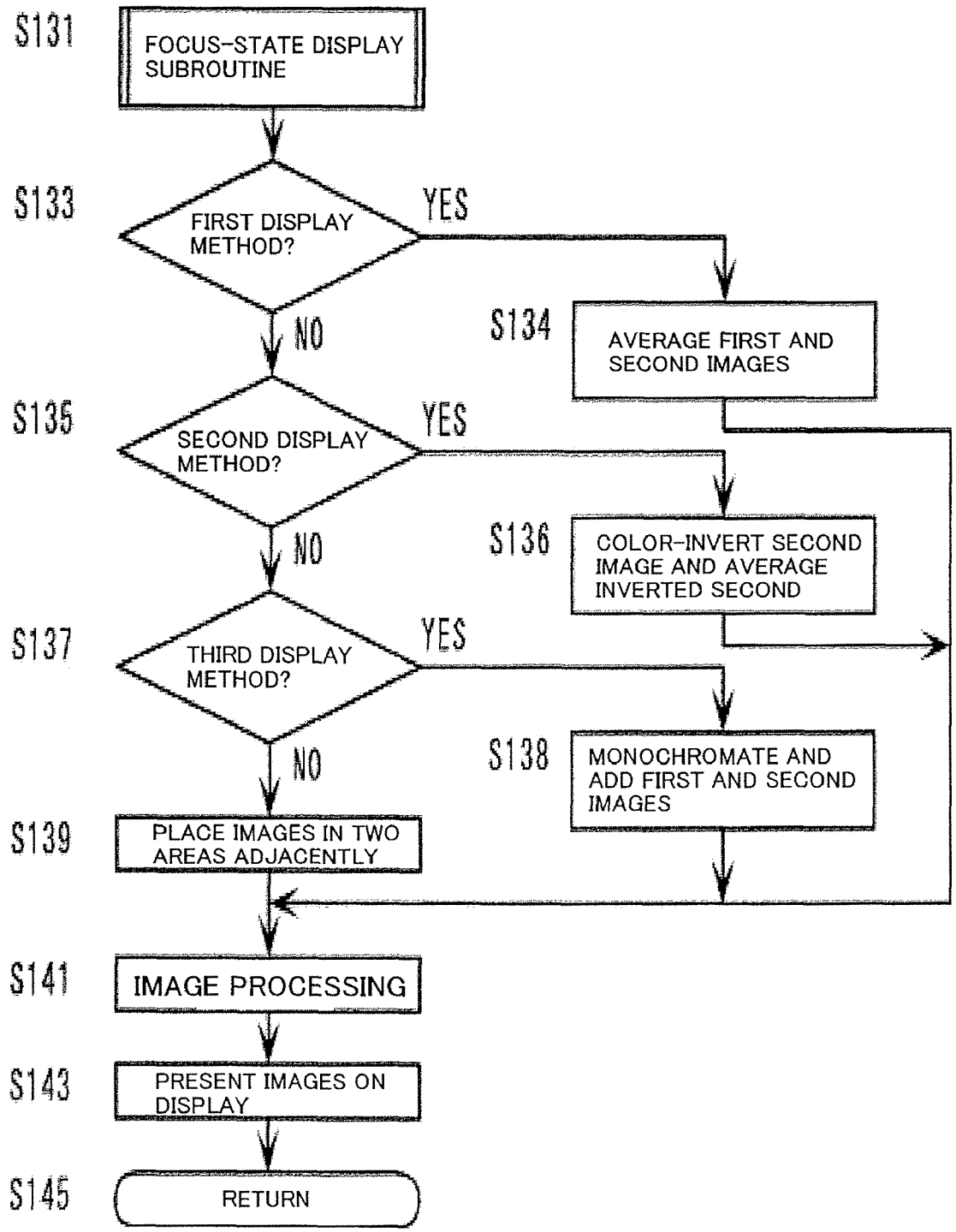
FIG. 9 shows a flow chart showing a focus-state display subroutine shown in FIG. 7.

FIG. 9 is a flow chart of the focus-state display subroutine. When the control jumps to step S131 of the subroutine from step S123 of the main flow, the focus-state display method selected at step S117 in the mode setting subroutine in FIG. 8 is determined at step S133.

When the selected focus-state display method is the first display method, the control proceeds to step S134. At step S134, the images in the two focus detection areas are averaged as described with reference to FIGS. 4A to 4D, and then the control proceeds to step S141. When the selected focus-state display method is not the first display method at step S133, the control proceeds to step S135 to again determine the display method.

When the selected focus-state display method is the second display method, the control proceeds to step S136. At step S136, the images in the second focus detection area AFARb are color-inverted for each of RGB colors, and the inverted images and the images in the first focus detection area AFARa are averaged as described with reference to FIGS. 5A to 5D, and then the control proceeds to step S141. When the selected focus-state display method is not the second display method at step S135, the control proceeds to step S137 to again determine the display method.

When the selected focus-state display method is the third display method, the control proceeds to step S138. At step S138, the images in the first and second focus detection areas are converted into the mono-color images of different hues and those images are added as described with reference to FIGS. 6A to 6D, and then the control proceeds to step S141. When the selected focus-state display method is not the third display method at step S137, the control proceeds to step S139.

At step S139, the images in the first area AFARa and the images in the second area AFARb are arranged adjacently in the vertical direction. In other words, if none of the first to third methods is selected, the two images having parallax information are not added but arranged adjacently. Then, the control proceeds to step S141.

At step S141, the images produced from step S134 to step S139 are subjected to processing for increasing the suitability for display. Specifically, the processing includes edge enhancement and contrast enhancement for a higher visibility, resizing (enlargement or reduction) for fitting to the number of display pixels on the display, and the like. At step S143, the images produced at step S141 are presented on the display 131. Then, at step S145, the control returns to step S151 of the main flow in FIG. 7.

At step S151 in FIG. 7, the type of the focus adjustment mode selected at step S115 of the mode setting subroutine in FIG. 8 is determined. If the MF mode has been selected, the control jumps to step S171. On the other hand, if the AF mode has been selected, the control proceeds to step S153. At step S153, the defocus amount of the object is calculated by detecting the relative horizontal shift in the images in the first area AFARa and the images in the second area AFARb shown in FIG. 4A. Specifically, the calculation may be performed with the technique disclosed in Japanese Patent Laid-Open No. 61(1986)-22316, for example.

At step S159, it is determined whether or not the object is in focus, that is, whether or not the defocus amount calculated at step S153 is equal to or lower than a predetermined value. If the object is not in focus, the control proceeds to step S157 to drive the focus lens based on the defocus amount and the defocus direction. The defocus amount is again calculated at step S153. Step S153 to S157 are repeatedly performed until the focus state is achieved. Then, the control proceeds to step S159 from step S155. At step S159, a predetermined in-focus display is presented on the display 131.

At step S171, it is determined whether or not an image-pickup start switch has been turned on. If it has not been turned-on, the image-pickup standby state is maintained at step S171. If the image-pickup start switch has been turned on at step S171, the control proceeds to step S181 to perform an image-pickup subroutine.

Figure 10:
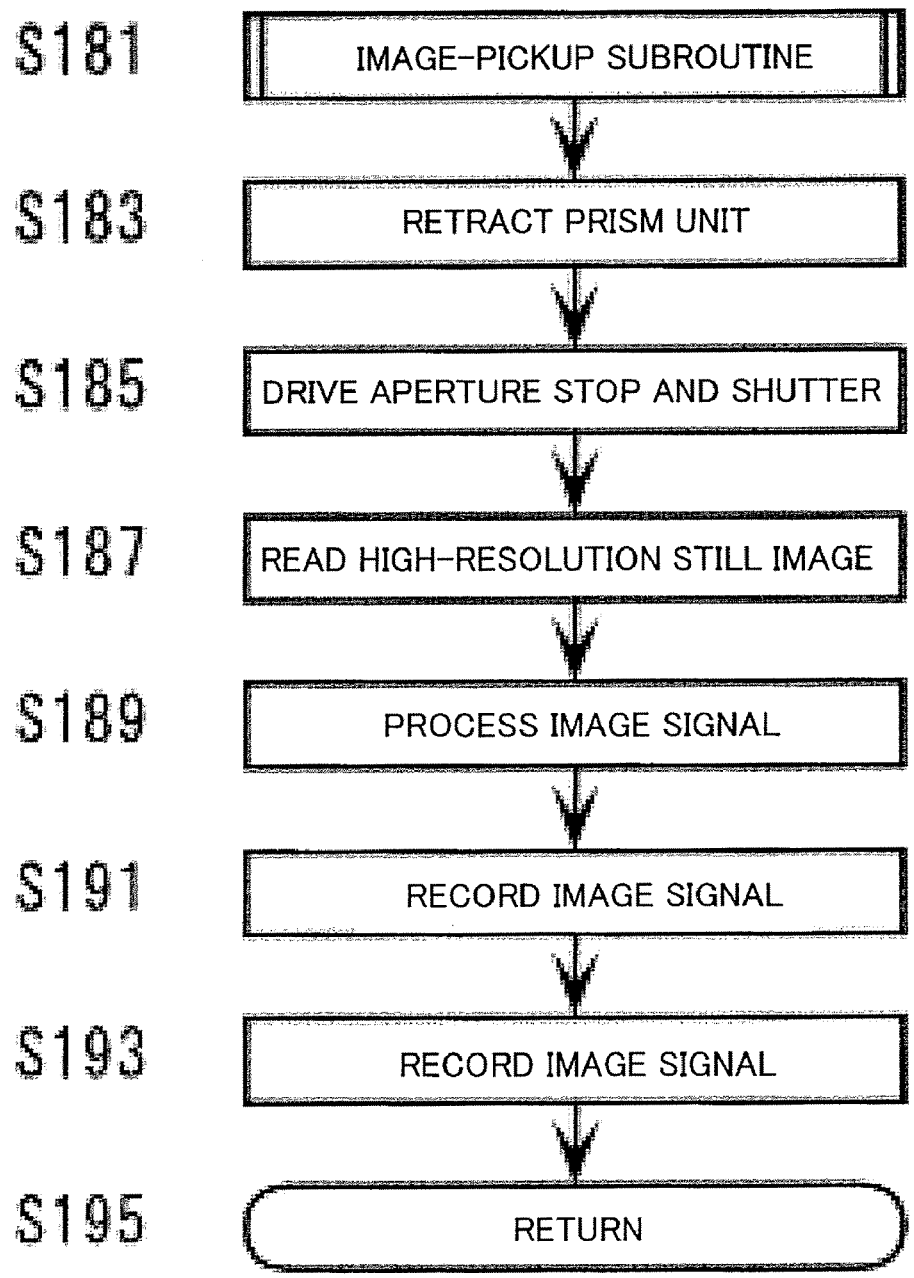
FIG. 10 shows a flow chart showing an image-pickup subroutine shown in FIG. 7.

FIG. 10 shows a flow chart of the image-pickup subroutine. When the image-pickup start switch is turned on, the control proceeds from step S181 to step S183 where the prism unit 104 is driven to retract to the outside of the image-pickup optical path. Then, at step S185, the aperture stop for light-amount adjustment is driven to control the opening of the mechanical shutter for adjusting the exposure time. At step S187, image reading is performed for picking up a high-resolution still image, that is, all of the pixels are read out. At step S189, the read image signal is subjected to various processing. The picked-up image is recorded on the flash memory 133 at step S191. At step S193, the picked-up image is presented on the display 131. A step S195, the control returns to the main flow in FIG. 7. After the control returns to the main flow in FIG. 7, the series of operation is ended at step S199.

Embodiment 1 accomplishes the following effects.

Specifically, in the first display method in which the two images having phase-difference information are averaged and displayed, the out-of-focus state of the object can be presented as the displacement in the full-color double image. Thus, the electronic viewfinder can provide the focusing function similar to that of a double-image superimposing finder in a conventional camera having a range finder.

In the second display method in which one of the two images having phase-difference information is color-inverted, and the inverted image and the other are averaged and displayed, the embossing effect can be provided for the outline of the out-of-focus object. Since the degree of the embossing effect is proportional to the out-of-focus amount, the focus state of the object can be easily checked even in the camera in which the low-resolution electronic display is used.

In the third display method in which the two images having phase-difference information are converted into the mono-color images of the first and second hues and the converted images are added for display, the in-focus object provides the mono-color image of the third hue. The out-of-focus object provides the mono-color outline of the first or second hue in the edge portion. Since the width of the outline is proportional to the out-of-focus amount, the focus state of the object can be easily checked even in the camera in which the low-resolution electronic display is used.

Since one of the plurality of display methods can be selected, the optimal display method can be used in accordance with the image-pickup situations or the object conditions to improve the accuracy in checking the focus state.

The abovementioned display methods can also be used in the manual focus operation, so that the focus state is easily known when extremely accurate focus adjustment is necessary for a particular point of an object. Therefore, extremely accurate focusing can be realized in image pickup such as macro photography, image-pickup of commercial goods, and portraits.

Second Embodiment

In Embodiment 1, the light flux-deflecting element is inserted near the pupil of the image-pickup optical system in focus detection to form the two parallax images for focus detection simultaneously on the image-pickup element 107. In Embodiment 2, a parallax image for focus detection is formed in chronological order on an image-pickup element 107, and two images acquired at different points on the time axis are used to perform focus detection and focus-state display. In the following, the operation of a camera 100A of Embodiment 2 will be described with reference to FIGS. 11 to 14.

Figure 11:
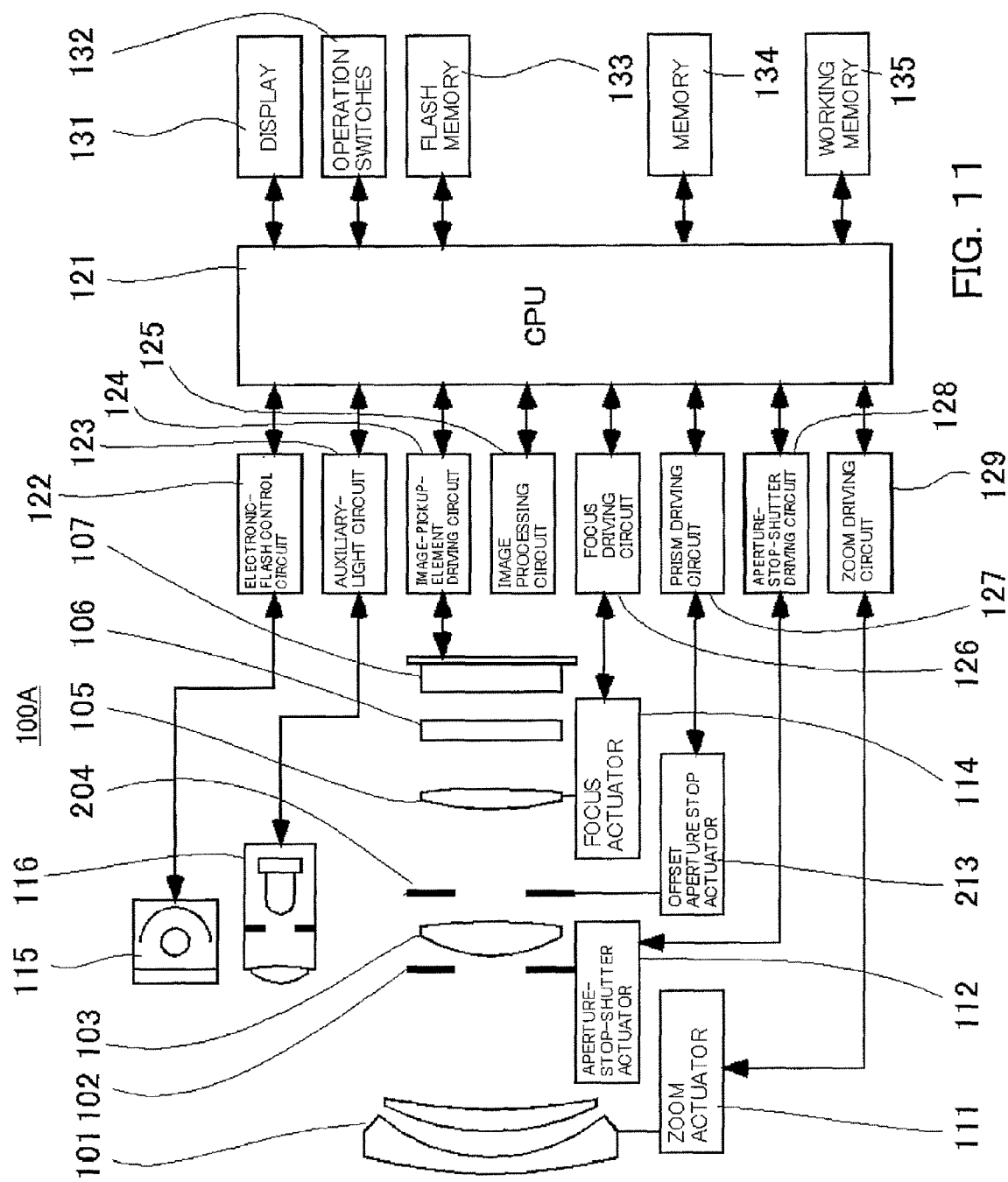
FIG. 11 is a block diagram schematically showing a camera according to Embodiment 2 of the present invention.

FIG. 11 is a block diagram schematically showing the camera 100A and corresponds to FIG. 1 of Embodiment 1. The camera 100 includes the prism unit 104 near the pupil of the image-pickup optical system such that the prism unit 104 is driven to enter and retract from the image-pickup optical path by the actuator 113. In contrast, the camera 100A includes an offset aperture stop 204 having an opening, the position of which is chronologically changed, and an actuator 213 of the offset aperture stop 204. The actuator 213 performs a first driving operation for moving the offset aperture stop 204 into and from the image-pickup optical path and a second operation for moving the opening portion of the offset aperture stop 204 in the image-pickup optical path. The other components of the camera 100A are identical to that of the camera 100, so that description thereof is omitted.

Figure 12A:
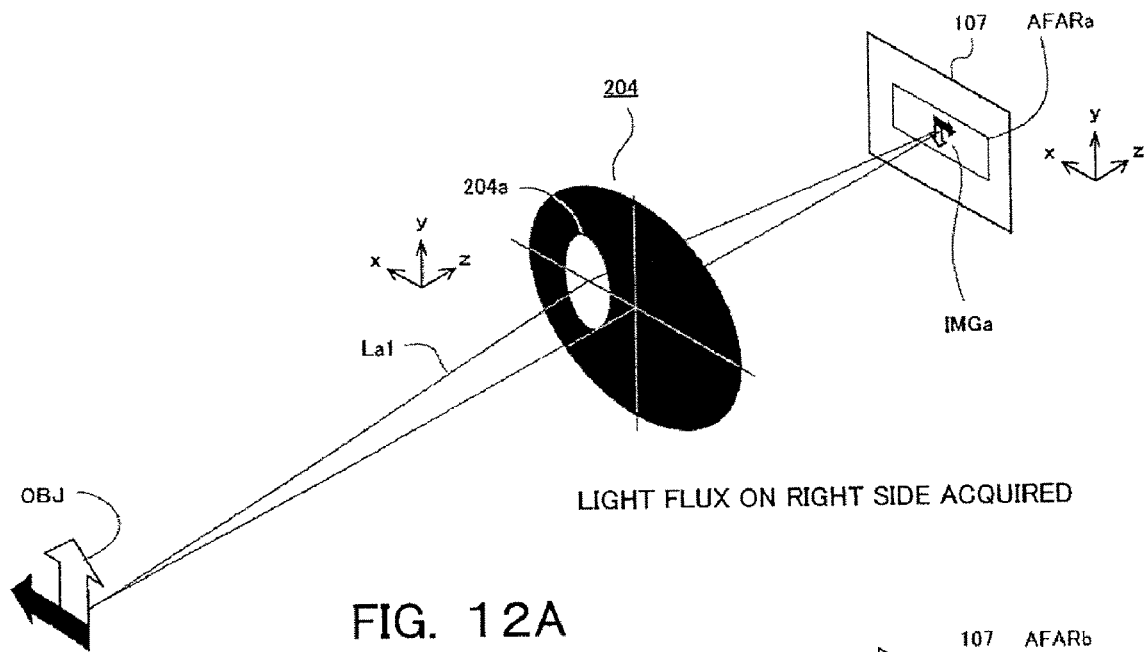
FIGS. 12A and 12B are schematic perspective views for explaining the principles of focus detection with the main portions of an image-pickup optical system shown in FIG. 11.
Figure 12B:
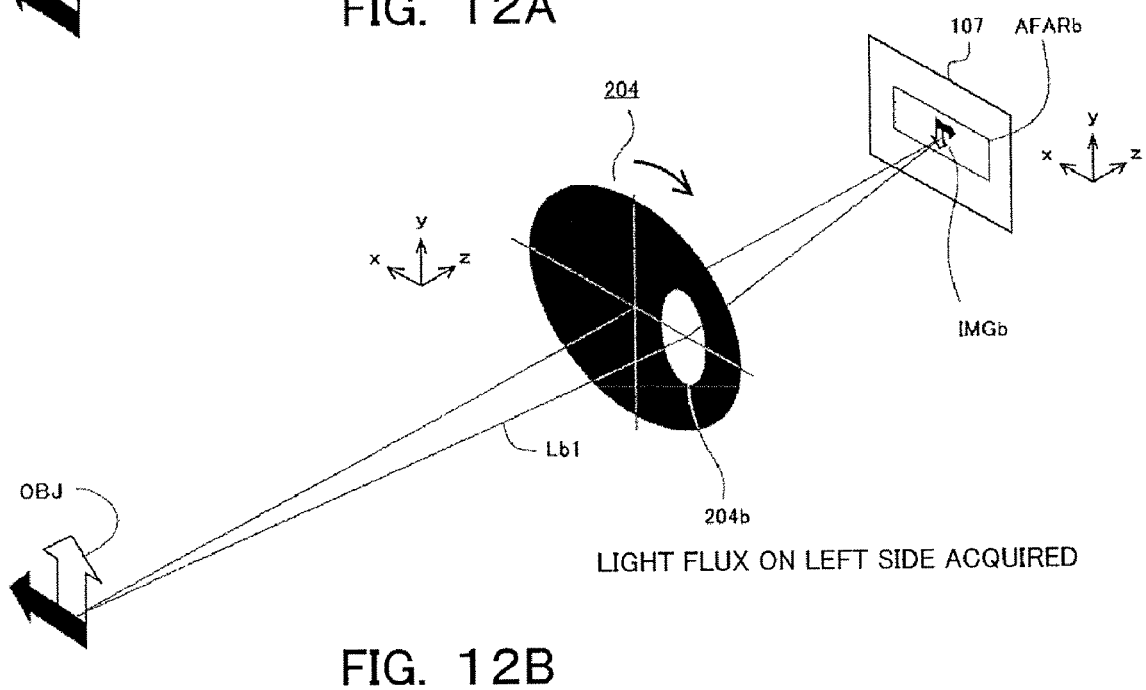

FIGS. 12A and 12B are diagrams for explaining the principles of focus detection in Embodiment 2 of the present invention and corresponds to FIG. 2A. In Embodiment 2, an unit for forming two images having parallax information is an image-pickup optical system, not shown in FIGS. 12A and 12B, and the offset aperture stop 204 serving as a pupil splitter. The offset aperture stop 204 includes a circular light-shield plate having the opening portion at a position deviated from the center of an optical axis. The deviated opening portion can be changed by an actuator, not shown.

In FIG. 12A, the opening portion 204a is deviated rightward in an x direction (in a positive direction) when viewed from the image-pickup element 107. A light flux travels from an OBJ, enters the opening portion 204a, is converted by a lens unit, not shown, and forms a first object image IMGa on a light-receiving surface of the image-pickup element 107. After the first object image IMGa is acquired, the offset aperture stop 204 is rotated 180 degrees around the optical axis by the actuator, not shown, to stop at a position shown in FIG. 12B. In this state, the opening 204b is deviated leftward in the x direction (in a negative direction) when viewed from the image-pickup element 107. A light flux travels from the OBJ, enters the opening 204b, is converted by the lens unit, not shown, and forms a second object image IMGb on the light-receiving surface of the image-pickup element 107.

The relative positions of the first object image IMGa and the second object image IMGb in the x direction are changed in accordance with the focus state. The defocus amount of the object OBJ can be detected by calculating the relative positions. As described with reference to FIGS. 4A to 6B, in the camera 100, the two images having phase-difference information are formed simultaneously in parallel on the image-pickup element 107. In the camera 100A, however, two object images having phase-difference information are acquired in two separate times in association with the switching operation of the offset aperture stop 204.

The specific configuration of the offset aperture stop 204 is preferably realized by using the technique disclosed in Japanese Patent Laid-Open No. 9(1997)-184972 in which an aperture-stop plate having an opening of a predetermined shape is used to define the opening of a pupil portion and a shield plate is used to switch between opening positions deviated from the optical axis. Alternatively, the technique disclosed in Japanese Patent Laid-Open No. 6(1994)-175015 may be used, in which pupil positions are switched by controlling the transmittance of a liquid crystal plate. Other suitable methods may be used.

FIGS. 13A and 13B are diagrams for explaining the processing method of an image for display on a display in focus detection, and correspond to FIGS. 4A to 4D of Embodiment 1. In Embodiment 2, selection can be made from a plurality of display methods, similarly to Embodiment 1.

FIGS. 13A and 13B are diagrams for explaining processing steps in an area WM of a working memory 135. While the working memory in Embodiment 2 is identical to that of Embodiment 1, the images for focus detection are acquired in two separate times in Embodiment 2 to require twice the area WM. WM1 in FIG. 13A is for storing the object image IMGa acquired in FIG. 12A, and WM2 in FIG. 13A is for storing the object image IMGb acquired in FIG. 12B. The coordinates of each working memory are defined as (i,j,c,t), where i represents the coordinate in the horizontal direction and j represents the coordinate in the vertical direction with the upper left point as the original, c represents color information and corresponds to a memory area for storing the information of the primary colors of R (Red), G (Green), and B (Blue), and t represents the order of acquisition of the images, in which t1 represents the memory information of the image acquired first, that is, the storage area of the object image IMGa, and t2 represents the memory information of the image acquired next, that is, the storage area of the object image IMGb.

As shown in FIG. 13A, object images IMGa1 to IMGa3 formed by the light fluxes which passed through the opening 204a of the offset aperture stop 204 and their backgrounds are developed in the focus detection area AFARa. Similarly, object images IMGb1 to IMGb3 formed by the light fluxes which passed through the opening 204b of the offset aperture stop 204 and their backgrounds are developed in the focus detection area AFARb. An image signal at an arbitrary point is represented by IMGS(i,j,c,t).

FIG. 13B shows images after the images developed in the areas WM1 and WM2 shown in FIG. 13A are subjected to arithmetic processing for display on the display 131. An image signal at an arbitrary point is represented by IMGD(i,j,c). In a first display method, an image IMGD for display is produced by adding the image signals IMGS at the corresponding pixels in the two images acquired at different times according to an expression 6.

$$IMGD(i,j,c)=\{IMGS(i,j,c,t1)+IMGS(i,j,c,t2)\}/2 \quad \text{EXPRESSION 6}$$

In other words, the image for display is provided by averaging the two images having parallax information. The image for display after the averaging is similar to the image described in FIGS. 4A to 4D of Embodiment 1. Figures corresponding to FIGS. 4C and 4D are omitted.

As described above, in the first display method of Embodiment 2, the in-focus object is presented as an ordinary image, while the out-of-focus object is presented as a double image with a horizontal displacement. The displacement of the displayed image is proportional to the out-of-focus amount or the defocus amount. This allows a user to easily know the focus state of the object. The second display method shown in FIGS. 5A to 5D and the third display method show in FIGS. 6A and 6B in Embodiment 1 can be realized in a similar manner in Embodiment 2, so that description of the second and third display methods is omitted in Embodiment 2.

Figure 14:
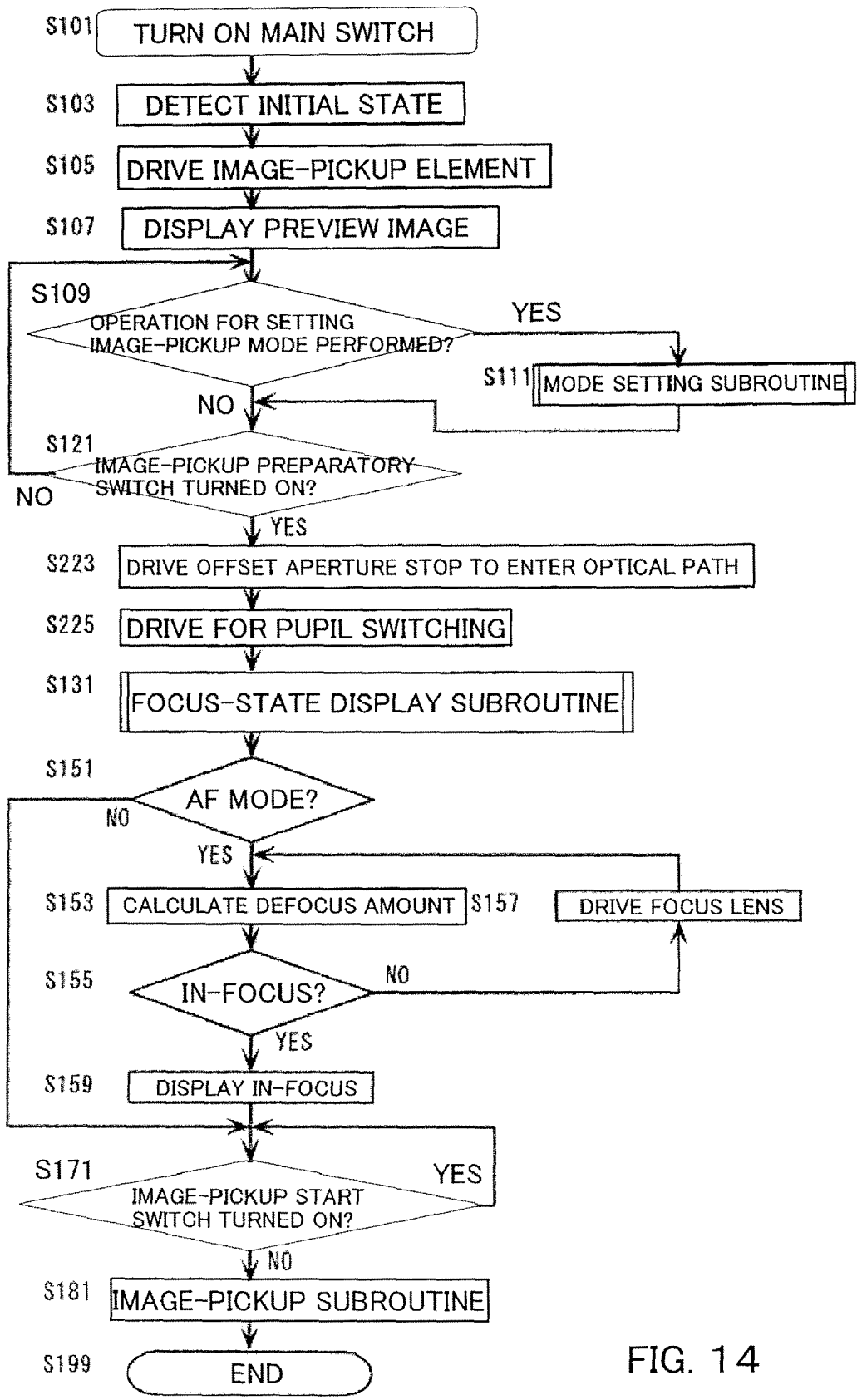
FIG. 14 shows a flow chart showing main control in Embodiment 2.

FIG. 14 is a flow chart for explaining the steps of displaying a focus state in the camera 100A. Since the flow in Embodiment 2 is substantially the same as the flow in Embodiment 2 shown in FIGS. 7 to 10, only different steps will be described and description of the same steps will be omitted.

In the main flow in FIG. 7 of Embodiment 1, when the image-pickup preparatory switch is turned on at step S121, the prism unit is caused to enter the optical path at step S123. FIG. 14 of Embodiment 2 differs from FIG. 7 in that step S123 is replaced with steps S223 and S225, and the remaining steps are identical. Thus, only steps S223 and 225 will be described.

In FIG. 14, after steps S101 to S111 are performed and the image-pickup preparatory switch is turned on at step S121, the control proceeds to step S223. At step S223, the offset aperture stop 204 shown in FIG. 11 is caused to enter the image-pickup optical path. Then, at step S225, control of pupil switching is performed such that the opening portion 204a of the offset aperture stop 204 is periodically switched between the position in FIG. 12A and the position in FIG. 12B in synchronization with the time when the image-pickup element acquires an image. The control proceeds to a subroutine for displaying a focus state at step S131.

The flow in the subroutine is basically the same as that shown in FIG. 9 of Embodiment 1 except for steps S134, S136, S138, and S139 in that the calculations at those steps in Embodiment 2 are performed for the two images acquired at different times as described with FIG. 13 and the expression 6.

The processing at step S151 in the main flow is basically the same as that in Embodiment 1. The mode setting subroutine at step S111 and the image-pickup subroutine at step S181 are basically the same as the flows described in FIGS. 8 and 10 in Embodiment 1, respectively.

The camera 100A provides the same effects as those of the camera 100. Since the offset aperture stop 204 serving as the pupil splitter of the camera 100A is realized by the simple opening portion 204a, the object image in focus detection includes reduced aberration and flare as compared with those in the image provided by the camera 100. Therefore, any of the display methods described in FIGS. 4 to 6 can present the focus state more obviously and is advantageous especially when a still object is brought into focus through manual operation.

Third Embodiment

The cameras 100 and 100A perform focus detection with the two images formed on the image-pickup element and having parallax information and then perform the predetermined processing on the two images to produce the image for display. Embodiment 3 involves performing focus detection by a dedicated AF sensor provided separately from an image-pickup element and performing predetermined processing on an image formed in the image-pickup element based on the focus detection result to produce an image for display. Description will hereinafter be made of a camera 100B of Embodiment 3 with reference to FIGS. 15 to 18.

FIG. 15 is a block diagram schematically showing the camera 100B and corresponds to FIG. 1 in Embodiment 1. The cameras 100 and 100A include the prism unit 104 and the offset aperture stop 204 serving as the pupil splitter near the pupil of the image-pickup element, respectively, and perform focus detection with the images acquired by the image-pickup element 107. In contrast, the camera 100B includes a beam splitter 304 having a semi-transmissive surface in the optical path of an image-pickup element. A light flux is reflected by the semi-transmissive surface, directed to the outside of the image-pickup optical path, and received by a focus detection unit 305 for performing focus detection. The focus detection unit 305 contains a pupil-splitting optical system and a phase-difference-detection line sensor which is placed at a position optically equivalent to the position of the light-receiving surface of an image-pickup element 107. Two images are projected onto the line sensor and their relative positions are detected to determine the defocus amount of an object. Specifically, the technique disclosed in Japanese Patent Laid-Open No. 2003-140246 and Japanese Patent Laid-Open No. 2000-2909 may be used. A focus detecting unit of another type may be used.

Reference numeral 324 shows an AF-sensor driving circuit which controls the driving of the sensor contained in the focus detection unit 305. Reference numeral 313 shows a beam-splitter driving actuator which drives the semi-transmissive portion of the beam splitter 304 to two states, that is, a position where it is placed in an image-pickup light flux and a position where it is retracted above the image-pickup light flux. The driving of the beam splitter 304 causes no change in the length of the image-pickup optical path. Reference numeral 327 shows a driving control circuit of the BS actuator 313.

In Embodiment 3, the beam splitter 304 is caused to enter the image-pickup optical path in focus detection, and part of the image-pickup light flux is reflected to allow the focus detection unit 305 to detect the focus state of an object in a focus detection area, that is, the defocus amount. On the other hand, part of the light flux passes through the semi-transmissive portion of the beam splitter 304 and forms an object image on the image-pickup element 107. In image pickup, the semi-transmissive portion of the beam splitter 304 is retracted upward, and the portion of the beam splitter placed in the effective component of the image-pickup light flux is transparent and flat.

The configuration specific to the camera 100B is described as above. The remaining portions are identical to those of the camera 100 and description thereof is omitted.

FIGS. 16A to 18 are diagrams for explaining the processing method of images for display on a display in focus detection and correspond to FIGS. 4A to 6B in Embodiment 1. The camera 100B also allows selection from a plurality of display methods.

Figure 16A:
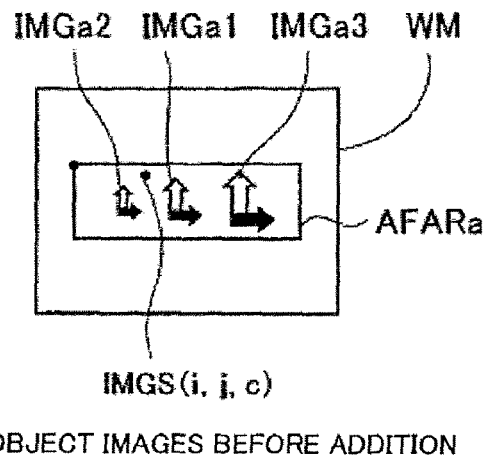
FIGS. 16A to 16D are plan views for explaining a first display method for display on a display shown in FIG. 15.

In FIG. 16A, an area WM stores an object image acquired by the image-pickup element 107 in focus detection. Such an object image is a single image from a light flux which passed through the entire pupil area of the image-pickup optical system and has no parallax information. Object images IMGa1 to IMGa3 and their backgrounds are developed as singe images in the area WM. An image signal at an arbitrary point is represented by IMGS(i,j,c). The definition is the same as that in Embodiment 1.

Figure 16B:
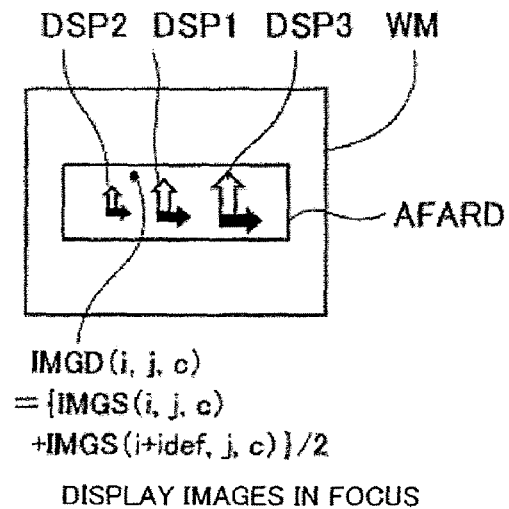

FIG. 16B shows images after the images developed in the area WM shown in FIG. 16A are subjected to arithmetic processing for display on a display 131. An image signal at an arbitrary point is represented by IMGD(i,j,c). In a first display method of Embodiment 3, an image IMGD for display is produced according to an expression 7.

$$IMGD(i,j,c) = \{IMGS(i,j,c) + IMGS(i+idef,j,c)\}/2 \quad \text{EXPRESSION 7}$$

IMGS(i,j,c) in the first term on the right side represents the image developed in FIG. 16A, and IMGS(i+idef,j,c) in the second term on the right side represents the image in the first term shifted horizontally by idef (in pixels), and idef represents a value proportional to the defocus amount of the object in the focus detection area detected by the focus detection unit 305.

Specifically, in the first display method of Embodiment 3, the out-of-focus amount of the object is first detected by the focus detection unit 305. Then, the single image acquired by the image-pickup element 107 and its duplicated image are prepared. The single image and the duplicated image are averaged such that the two images are horizontally shifted by idef which is proportional to the defocus amount. With these calculations, the resulting image for display is a double image having a shift amount proportional to the out-of-focus amount or the defocus amount. Thus, a user can easily know the focus state of the object.

FIG. 16B shows images when the OBJ1 at the center is in focus. In Embodiment 1 shown in FIG. 4B, the in-focus main object image DSP1 at the center is not the non-double image, and the out-of-focus images on both sides thereof are double images. In contrast, in Embodiment 3, even when a plurality of objects are located at different distances and any of them is out of focus, that object provides a non-double image if the focus detection unit 305 determines an in-focus state.

Figure 16C:
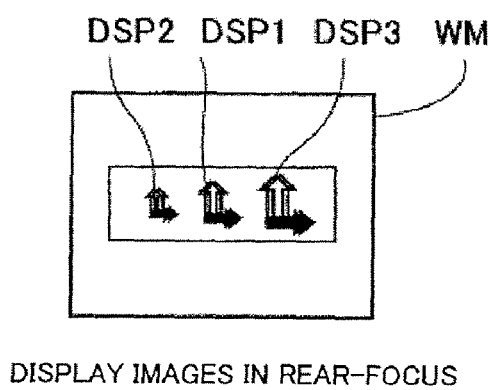
Figure 16D:
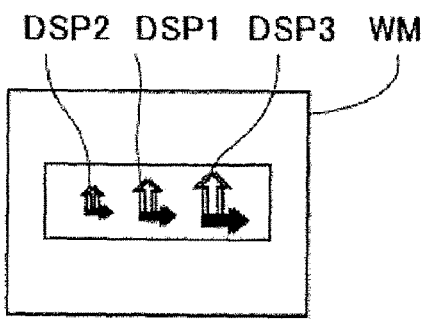

FIG. 16C shows images when focus is achieved rearward of the main object at the center, that is, when the object on the left at the relatively longer distance is in focus. The focus detection unit 305 determines the rear-focus and the calculation in Expression 7 is performed on the basis of the determination, so that all of object images DSP1 to DSP3 are double images having equal horizontal shifts. This applies to FIG. 16D which represents images when focus is achieved forward of the main object.

FIGS. 17A to 17D are diagrams for explaining a second display method in Embodiment 3 and corresponds to FIG. 5 in Embodiment 1. In the first display method of Embodiment 3, the single image acquired by the image-pickup element and its duplicated image are horizontally shifted by the predetermined amount and presented one on another based on the focus state detected by the focus detection unit. In contrast, in the second method of Embodiment 3, one of the original image and its duplicated image is inverted and added to the other to enhance the edge portion in the entire displayed image in accordance with an out-of-focus state.

Figure 17A:
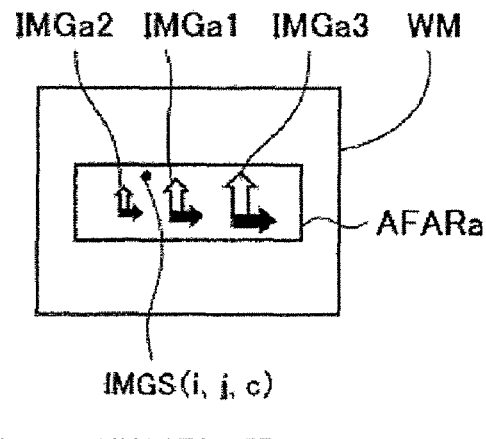
FIGS. 17A to 17D are plan views for explaining a second display method for display on the display shown in FIG. 15.
Figure 17B:
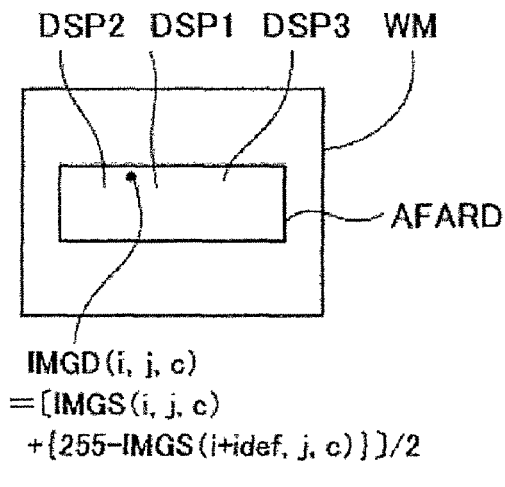
Figure 17C:
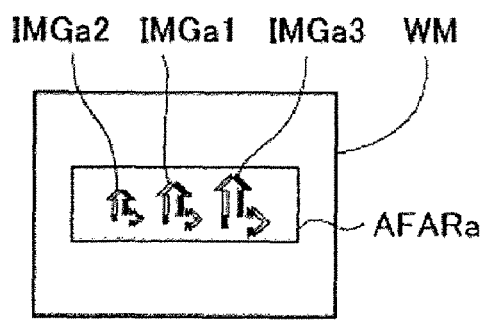
Figure 17D:
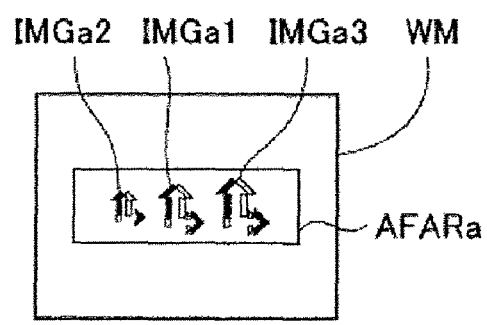

FIG. 17A shows an area WM for storing an object image acquired by the image-pickup element 107 in focus detection as in FIG. 15A. An image signal at an arbitrary point is represented by IMGS(i,j,c). FIGS. 17B to 17D show images after images developed in the area WM shown in FIG. 17A are subjected to arithmetic processing for display on the display 131. An image signal at an arbitrary point is represented by IMGD(i,j,c). In the second display method of Embodiment 3, an image IMGD for display is produced according to an expression 8.

$$IMGD(i,j,c) = [IMGS(i,j,c) + \{255 - IMGS(i+idef,j,c)\}]/\text{EXPRESSION 8}$$

IMGS(i,j,c) in the first term on the right side represents the image developed in FIG. 17A, {255−IMGS(i+idef,j,c)} in the second term on the right side represents the image in the first term shifted horizontally by idef (in pixels) and then color-converted, and idef represents a value proportional to the defocus amount of the object in the focus detection area detected by the focus detection unit 305 in FIG. 15 as described in the expression 8.

Specifically, in the second display method of Embodiment 3, the defocus amount of the object is first detected by the focus detection unit. Then, the single image acquired by the image-pickup element 107 and its duplicated image are prepared, and the duplicated image is color-inverted. The image after the color inversion is a full-color image of the complementary color to the original full-color image as described in the second display method of Embodiment 1. The single image is added to the color-inverted version of the duplicated image such that the two images are horizontally shifted by idef which is proportional to the out-of-focus amount.

FIG. 17B shows an image for display provided by performing the calculation of the expression 8 on the images in FIG. 17A when the object OBJ1 at the intermediate distance is in focus. Since the focus detection unit 305 in FIG. 15 determines that the defocus amount is equal to zero, the horizontal shift idef of the image is also equal to zero. Since the original image is added to the color-inverted image in FIG. 17B, the image after the addition is uniformly gray with contrast information or color information disappearing.

FIG. 17C shows images for display when the second object OBJ2 at the longer distance is in focus. Since the focus detection unit 305 in FIG. 15 determines that focus is achieved rearward of the main object OBJ1, the horizontal shift idef of the image is a value proportional to the defocus amount. Since the original image and the color-inverted image are horizontally shifted by the predetermined amount and added in FIG. 17C, the image after the addition includes an embossing effect in the edge portion.

FIG. 17D shows images for display when the third object OBJ3 at the shorter distance is in focus. Since the focus detection unit 305 in FIG. 15 determines that focus is achieved forward of the main object OBJ1, the horizontal shift idef of the image is a value proportional to the defocus amount. Since the original image and the color-inverted image are horizontally shifted by the predetermined amount in FIG. 17D, the image after the addition includes an embossing effect in the edge portion.

As described above, in the second display method of Embodiment 3, when the focus detection unit determines an in-focus state, the object image for display is uniformly gray with the color information lost and the luminance change disappearing. On the other hand, when the focus detection unit determines an out-of-focus state, the object image for display contains the abrupt change in the luminance and color at the edge portion to provide the embossing effect which is proportional to the out-of-focus amount or the defocus amount. When defocus is found in the opposite direction, the light and dark portions in the embossing effect are inverted. This allows the user to easily know the focus state of the object by determining the degree of the embossing effect.

FIGS. 18A to 18D are diagrams for explaining a third display method in Embodiment 3. The effect of the third display method is similar to that of the third display method of Embodiment 1. The coordinates of an area WM and the definitions of various images signals are identical to those in FIGS. 16A to 17D. The second display method involves color-inverting the duplicated version of the single image and adding the original image and the duplicated version such that their relative horizontal positions are proportional to the defocus amount, thereby presenting the edge portion of the image for display with the embossing effect. In contrast, the third method involves converting the original image into a mono-color image of a first hue and converting the duplicated image into a mono-color image of a second hue and then adding them. The operation results in display of a mono-color image of a third hue over the entire display area in an in-focus state and display of a mono-color double image including the first hue and second hue in an out-of-focus state.

Figure 18A:
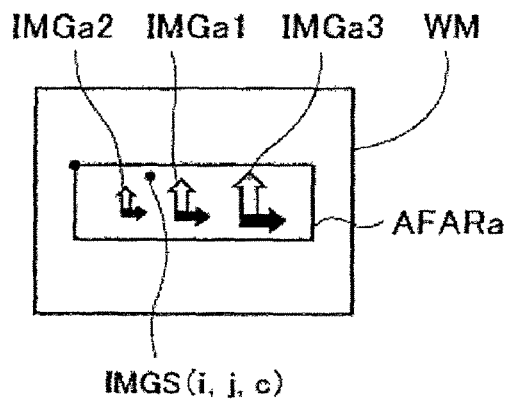
FIGS. 18A to 18D are plan views for explaining a third display method for display on the display shown in FIG. 15.

FIG. 18A corresponds to FIG. 6A. In Embodiment 3, the original image for display is a singe image. RGB signals IMGS(i,j,c) at the pixels in the focus detection area are converted into luminance Y, color differences R-Y, and color difference B-Y according to an expression 9.

$$\begin{pmatrix} [Y](i,j) \\ [R-Y](i,j) \\ [B-Y](i,j) \end{pmatrix} = \begin{pmatrix} C11 & C12 & C13 \\ C21 & C22 & C23 \\ C31 & C32 & C33 \end{pmatrix} \begin{pmatrix} IMGS(i,j,R) \\ IMGS(i,j,G) \\ IMGS(i,j,B) \end{pmatrix} \quad \text{EXPRESSION 9}$$

C11 to C33 represent conversion coefficients. Then, each color component of the original image signal. IMGS is substituted by using an expression 10.

$$\begin{pmatrix} IMGS(i,j,R,1) \\ IMGS(i,j,G,1) \\ IMGS(i,j,B,1) \end{pmatrix} = \begin{pmatrix} 0 \\ 1 \\ 0 \end{pmatrix} \begin{pmatrix} [Y](i,j) \\ [Y](i,j) \\ [Y](i,j) \end{pmatrix} \quad \text{EXPRESSION 10}$$

The numerical value one in IMGS(i,j,c,1) represents the original image. Specifically, the luminance value is substituted into the G component of the image signal and zero is substituted into the R and B components to convert the original image into a mono-color image of green. Then, each color component of the duplicated image is substituted by using an expression 11.

$$\begin{pmatrix} IMGS(i,j,R,2) \\ IMGS(i,j,G,2) \\ IMGS(i,j,B,2) \end{pmatrix} = \begin{pmatrix} 1 \\ 0 \\ 1 \end{pmatrix} \begin{pmatrix} [Y](i,j) \\ [Y](i,j) \\ [Y](i,j) \end{pmatrix} \quad \text{EXPRESSION 11}$$

The numerical value two in IMGS(i,j,c,2) represents the duplicated image. Specifically, the luminance value is substituted into the R and B components and zero is substituted into the G component to convert the duplicated image into a mono-color image of magenta which is the complementary color of green. In this manner, the abovementioned processing converts the original image into the mono-color image of green which is the first hue and converts the duplicated version of the original image into the mono-color image of magenta which is the second hue.

Figure 18B:
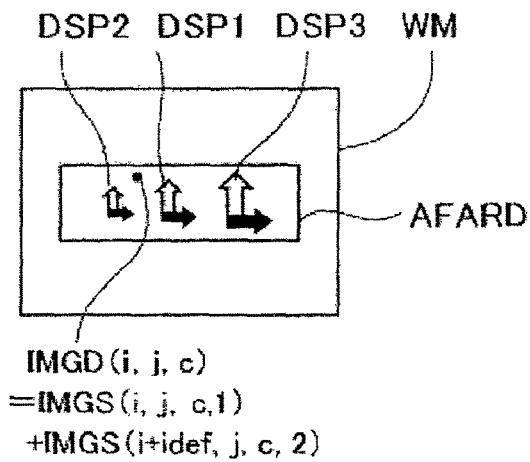
Figure 18C:
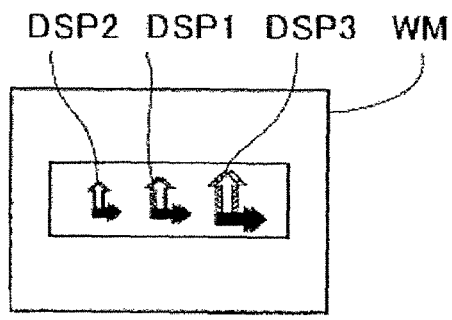
Figure 18D:
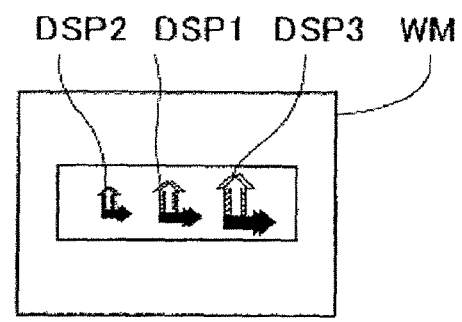

FIG. 18B corresponds to FIG. 6B and shows an image IMGD for display on the display 131. Figures corresponding to FIGS. 18C and 18D are omitted in FIG. 6. FIGS. 18C and 18D show images after the images developed on the area WM shown in FIG. 18A are subjected to arithmetic processing for display on the display 131 similarly to FIG. 18B. The display image IMGD is produced by using an expression 12 to add the two mono-color images produced according to the expressions 9 to 11.

$$IMGD(i,j,c) = \{IMGS(i,j,c,1) + IMGS(i+idef,j,c,2)\} \quad \text{EXPRESSION 12}$$

As described in the first and second display methods, idef represents a value proportional to the defocus amount detected by the focus detection unit 305 in FIG. 15.

FIG. 18B shows images for display when the first object OBJ1 at the intermediate distance is in focus. In the third method, two images of the complementary colors are added. When the focus detection unit determines an in-focus state, the defocus amount is equal to zero and thus idef is equal to zero, and the display image after the addition is an achromatic, monochrome image in the entire display area.

FIG. 18C shows images when focus is achieved rearward of the main object. Since the original image and the duplicated image are added such that they are horizontally shifted by idef proportional to the defocus amount, the luminance difference information of the two images remains in the original mono-color hue at the edge portion of the resulting object image. In other words, an outline of green or magenta is presented at the edge portion.

FIG. 18D shows images when focus is achieved forward of the main object. The original image and the duplicated image are added such that they are horizontally shifted by idef proportional to the defocus amount. Since the horizontal shift direction in the addition of the images is opposite to that in FIG. 18C, the mono-color hue appearing at the edge portion of the resulting image is the one different from that in FIG. 18C.

As described above, the third display method described in FIGS. 18A to 18D involves converting one of the images into the mono-color image of the first hue and the other into the mono-color image of the second hue, adding them, and presenting the resulting image on the display. When the focus detection unit determines an in-focus state, the mono-color image of the third hue is presented. On the other hand, when the focus detection unit determines an out-of-focus state, the outline of the first or second hue appears at the edge portion of the mono-color object image presented in the third hue. The thickness of the outline is proportional to the out-of-focus amount or the defocus amount. This allows a user to easily know the focus state of the object by checking the thickness of the outline.

Figure 19:
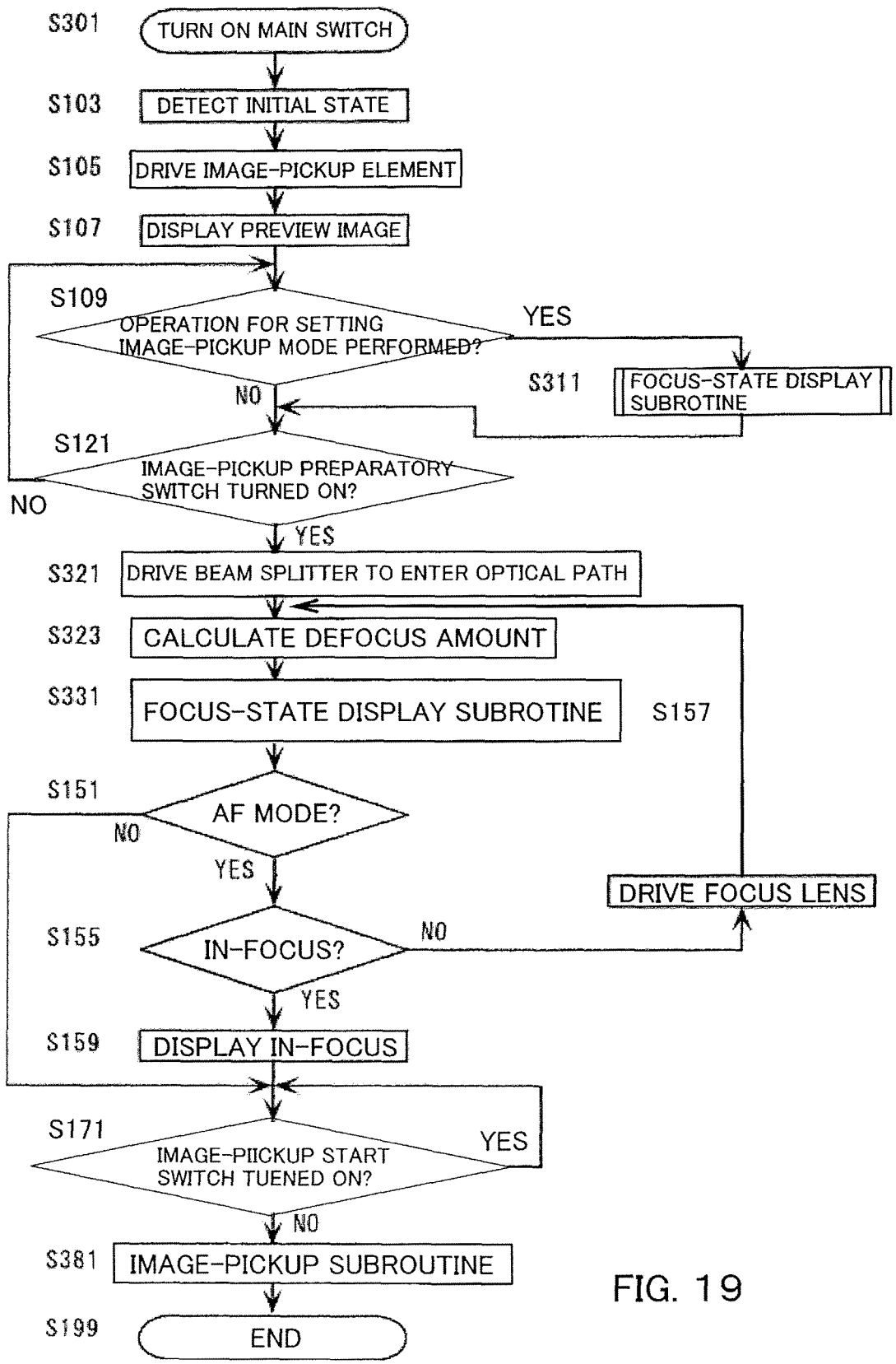
FIG. 19 shows a flow chart showing main control in Embodiment 3.
Figure 20:
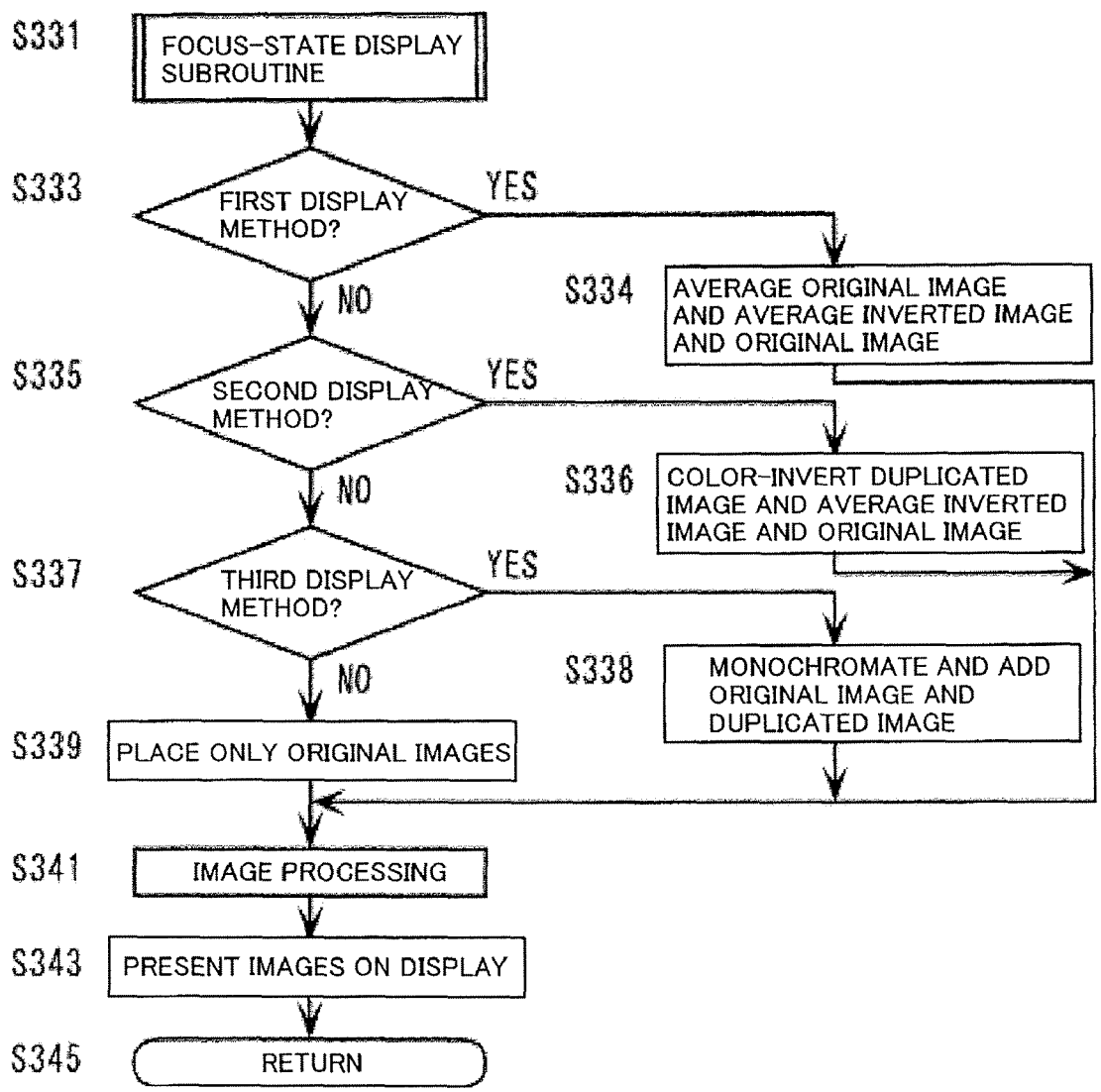
FIG. 20 shows a flow chart showing a focus-state display subroutine shown in FIG. 19.
Figure 21:
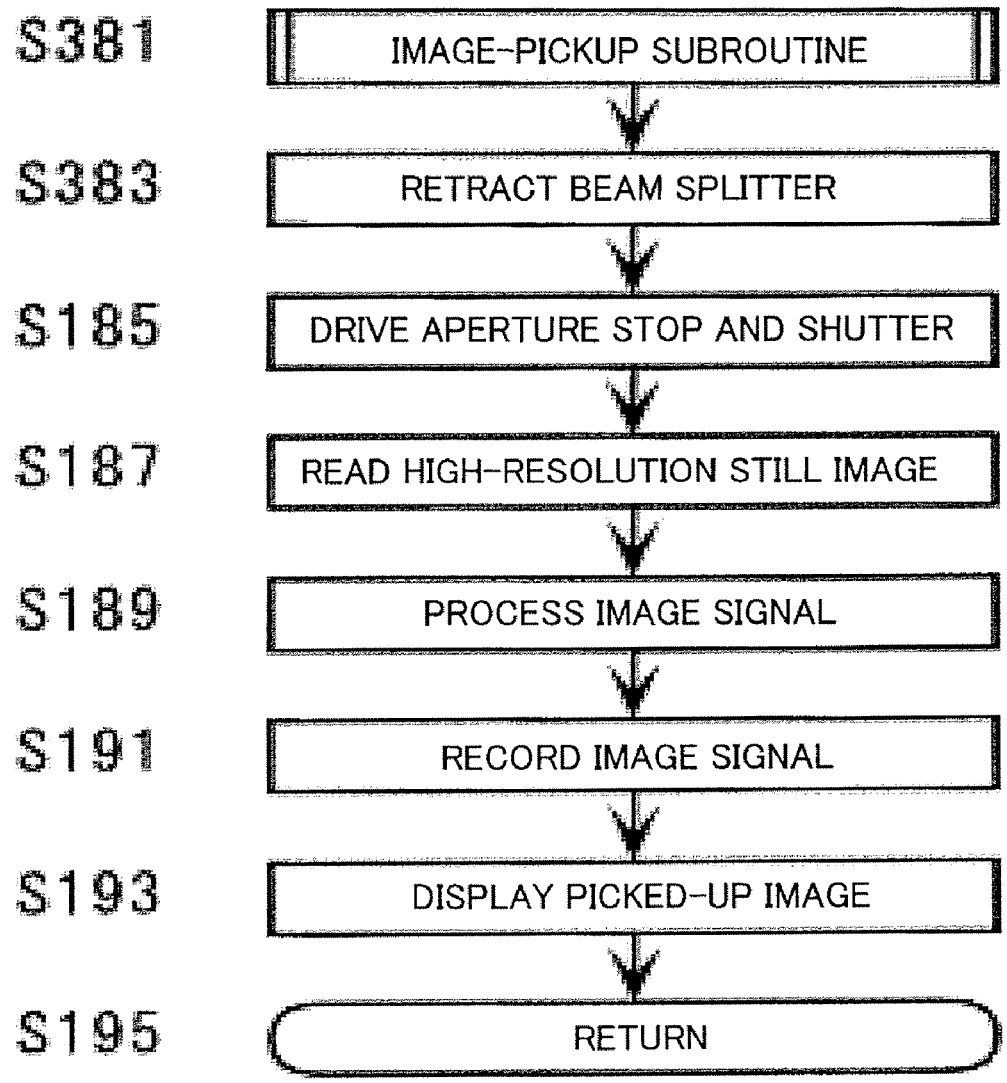
FIG. 21 shows a flow chart showing an image-pickup subroutine shown in FIG. 19.

FIGS. 19 to 21 is flow charts for explaining the steps of displaying a focus state in the camera 100B. The control flow in FIGS. 19 to 21 will hereinafter be described with reference to FIGS. 15 to 18D. In the following description, the flows identical to those in Embodiment 1 are designated with the same reference numerals and overlapping description of the steps is omitted.

FIG. 19 is a main flow in the camera 100B. At step S301, a user turns on the power switch of the camera 100B through a group of operation switches 132. At step S103, a CPU 121 checks the operations of the actuators and the image-pickup element 107 in the camera, initializes the memory and the execution program, and performs preparatory operation for image pickup. At step S105, the image-pickup operation of the image-pickup element 107 is started, and a low-resolution moving image is output for preview. At step S107, the read moving image is presented on the display 131, and the user sees the preview image to set the composition for picking up images.

At step S109, it is determined whether or not the user has selected an image-pickup mode. If the user has selected it, the control jumps to a mode setting subroutine at step S311. Since the subroutine at step S311 is identical to the flow shown in FIG. 8 of Embodiment 1, description thereof is omitted.

At step S121, it is determined whether or not an image-pickup preparatory switch has been turned on. If it has not been turned on, the control returns to step S109 to maintain the standby state for mode setting operation. If the image-pickup preparatory switch has been turned on at step S121, the control proceeds to step S321. At step S321, the semi-transmissive portion of the beam splitter 304 is driven to enter the image-pickup optical path in order to direct the light flux for focus detection to the focus detection unit shown in FIG. 15. At step S323, the focus detection unit 305 performs focus detection to calculate the defocus amount. Then, a focus-state display subroutine is performed at step S331.

FIG. 20 is a flow chart of the focus-state display subroutine. At step S333, the focus-state display method selected at step S117 in the mode setting subroutine in FIG. 8 is determined.

When the selected focus-state display method is the first display method, the control proceeds to step S334. At step S334, the original images and the duplicated images are averaged as described with reference to FIGS. 16A to 16D, and then the control proceeds to step S341. When the selected focus-state display method is not the first display method at step S333, the control proceeds to step S335 to again determine the display method.

When the selected focus-state display method is the second display method, the control proceeds to step S336. At step S336, the duplicated images are color-inverted for each of RGB colors, and the inverted images and the original images are averaged as described with reference to FIGS. 17A to 17D, and then the control proceeds to step S341. When the selected focus-state display method is not the second display method at step S335, the control proceeds to step S337 to again determine the display method.

When the selected focus-state display method is the third display method, the control proceeds to step S338. At step S338, the original images and the duplicated images areas are converted into the mono-color images of different hues and those images are added as described with reference to FIGS. 18A to 18D, and then the control proceeds to step S341. When the selected focus-state display method is not the third display method at step S337, the control proceeds to step S339.

At step S339, the original images shown in FIG. 16A are prepared as images for display without any change. Then, the control proceeds to step S341. At step S341, the images produced from step S334 to step S339 are subjected to processing for increasing the suitability for display. Specifically, the processing includes edge enhancement and contrast enhancement for a higher visibility, resizing (enlargement or reduction) for fitting to the number of display pixels on the display, and the like. At step S343, the images produced at step S341 are presented on the display 131. Then, at step S345, the control returns to step S151 of the main flow in FIG. 19.

At step S151 in FIG. 19, the type of the focus adjustment mode selected at step S115 of the mode setting subroutine in FIG. 8 is determined. If the MF mode has been selected, the control jumps to step S171. On the other hand, if the AF mode has been selected, the control proceeds to step S155. At step S155, it is determined whether or not the object in the focus detection area is in focus, that is, whether or not the defocus amount calculated at step S323 is equal to or lower than a predetermined value.

If the object is not in focus, the control proceeds to step S157 to drive the focus lens based on the defocus amount and the defocus direction. The control returns to step S323 to again calculate the defocus amount. Step S323 to S155 are repeatedly performed until the focus state is achieved. Then, the control proceeds to step S159 from step S155. At step S159, a predetermined in-focus display is presented on the display 131.

At step S171, it is determined whether or not an image-pickup start switch has been turned on. If it has not been turned-on, the image-pickup standby state is maintained at step S171. If the image-pickup start switch has been turned on at step S171, the control proceeds to step S381 to perform an image-pickup subroutine.

FIG. 21 shows a flow chart of the image-pickup subroutine. When the image-pickup start switch is turned on, the control proceeds from step S381 to step S383 where the semi-transmissive portion of the beam splitter 304 is driven to retract to the outside of the image-pickup optical path. Then, at step S185, the aperture stop for light-amount adjustment is driven to control the opening of the mechanical shutter for adjusting the exposure time. At step S187, image reading is performed for picking up a high-resolution still image, that is, all of the pixels are read out. At step S189, the read image signal is subjected to various processing. The picked-up image is recorded on a flash memory 133 at step S191. At step S193, the picked-up image is presented on the display 131. A step S195, the control returns to the main flow in FIG. 19. After the control returns to the main flow in FIG. 19, the series of operation is ended at step S199.

Embodiment 3 accomplishes the following effects.

Specifically, in the first display method in which the original image acquired by the image-pickup element and its duplicated image are averaged and displayed on the basis of the detection result of the focus detecting unit, the out-of-focus state of the object can be presented as the displacement in the full-color double image. Thus, the electronic viewfinder can provide the focusing function similar to that of a double-image superimposing finder in a conventional camera having a range finder.

In the second display method in which one of the original image acquired by the image-pickup element and its duplicated image is color-inverted, and the inverted image and the other are averaged and displayed on the basis of the detection result of the focus detecting unit, the embossing effect can be provided for the outline of the image for display.

Since the degree of the embossing effect is proportional to the out-of-focus amount, the focus state of the object can be easily checked even in the camera in which the low-resolution electronic display is used.

In the third display method in which the original image acquired by the image-pickup element and its duplicated image are converted into the mono-color images of the first and second hues and the converted images are added and displayed on the basis of the detection result of the focus detecting unit, the image for display is the mono-color image of the third hue in the in-focus state. In the out-of-focus state, the image for display contains the mono-color outline of the first or second hue in the edge portion of the image. Since the width of the outline is proportional to the out-of-focus amount, the focus state of the object can be easily checked even in the camera in which the low-resolution electronic display is used.

Embodiment 1 and Embodiment 2 require the pupil splitter near the pupil of the image-pickup optical system. In contrast, Embodiment 3 includes the focus detecting unit placed between the main portions of the image-pickup optical system and the image-pickup element. Therefore, the focus state of the object can be easily checked even in the digital camera in which interchangeable lenses are used.

Embodiment 3 accomplishes the following effects similar to those in Embodiment 1.

First, since one of the plurality of display methods can be selected, the optimal display method can be used in accordance with the image-pickup situations or the object conditions to improve the accuracy in checking the focus state. Next, the abovementioned display methods can also be used in the manual focus operation, so that the focus state is easily known when extremely accurate focus adjustment is necessary for a particular point of an object. Thus, extremely accurate focusing can be realized in image pickup such as macro photography, image-pickup of commercial goods, and portraits.

In this manner, the cameras 100 to 100B convert the out-of-focus amount of the object into the horizontal shift and display it such that the object image is presented as the double image in accordance with the out-of-focus amount. The image information in the in-focus area may be lost and the object information in the out-of-focus area may be left and displayed. Alternatively, the outline of the object in the out-of-focus area may be displayed with enhancement including color information. Furthermore, the outline of the object in the out-of-focus area may be enhanced with light and dark portions. When the object images of the different hues in the complementary relationship are displayed in the in-focus area and the out-of-focus area, the result is that the gray image (monochrome image) is presented with the chroma disappearing in the in-focus area and the image of the first or second hue is presented in the out-of-focus area. The pair of object images may be used for focus detection and focus-state display. The single image having no parallax information may be provided with parallax information and presented as the double image.

The entire disclosure of Japanese Patent Application No. 2006-302047, filed on Nov. 7, 2006, including claims, specification, drawings and abstract incorporated herein by reference in its entirety.

While several preferred embodiments of the present invention have been described, the present invention is no limited to these preferred embodiments and various variations and modifications may be made without departing from the scope of the present invention.

What is claimed is:

1. An image-pickup apparatus which picks up an image of an object, the image pickup apparatus comprising:
   a processor including:
      a producing unit for producing a pair of object images, the object images being displaced from each other in accordance with a displacement of the object from an in-focus position in an optical axis direction, wherein the producing unit includes pupil splitter for splitting a pupil area into a pair of areas placed symmetrically with respect to a direction perpendicular to the optical axis direction and to a direction perpendicular to the optical axis direction; and
      an image combining unit for superposing and combining the pair of object images produced by the producing unit into an image; and
   a display unit for displaying the image resulting from the combination by the image combining unit,
   wherein one of the pair of object images is formed through one of the symmetrical paired areas, and the other of the pair of object images is formed through the other of the symmetrical paired areas.

2. The image-pickup apparatus according to claim 1, wherein the image combining unit adds the pair of object images.

3. The image-pickup apparatus according to claim 1, wherein the image combining unit converts the signal level of one of the pair of object images and then combines the one image to the other image.

4. The image-pickup apparatus according to claim 3, wherein each of the pair of object images is a color image, and the image combining unit inverts each color information of one of the pair of object images and then combines the one image to the other image.

5. The image-pickup apparatus according to claim 3, wherein each of the pair of object images is a monochrome image containing lightness information extracted from a color image, and the image combining unit inverts the lightness information of one of the pair of object images and then combines the one image to the other image.

6. The image-pickup apparatus according to claim 1, wherein the image combining unit converts the pair of object images into mono-color images of different hues and then combines the converted mono-color images.

7. The image-pickup apparatus according to claim 6, wherein the different hues are complementary colors.

8. The image-pickup apparatus according to claim 1, wherein one of the pair of object images is provided by duplication of the other.

9. The image-pickup apparatus according to claim 1, wherein the image combining unit includes mode selecting unit for selecting a mode for enhancing the horizontal shift in combining the pair of object images.

\* \* \* \* \*